US008019529B1

(12) United States Patent
Sharma et al.

(10) Patent No.: US 8,019,529 B1
(45) Date of Patent: Sep. 13, 2011

(54) RUNWAY AND AIRPORT INCURSION ALERTING SYSTEM AND METHOD

(75) Inventors: Vivek Sharma, Kirkland, WA (US); Joel M. Wichgers, Urbana, IA (US); Matthew J. Carrico, Mount Vernon, IA (US); Sethu R. Rathinam, Cedar Rapids, IA (US); Stefan Koczo, Jr., Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 998 days.

(21) Appl. No.: 11/893,728

(22) Filed: Aug. 17, 2007

(51) Int. Cl.
*G08G 5/06* (2006.01)
*G06F 19/00* (2006.01)

(52) U.S. Cl. ........................................ 701/117; 701/301

(58) Field of Classification Search ........................ None
See application file for complete search history.

(56) References Cited

U.S. PATENT DOCUMENTS

| | | | |
|---|---|---|---|
| 3,781,878 A | 12/1973 | Kirkpatrick | |
| 3,885,237 A | 5/1975 | Kirkpatrick | |
| 4,259,658 A | 3/1981 | Basov et al. | |
| 4,390,949 A | 6/1983 | Beningfield et al. | |
| 4,399,425 A | 8/1983 | Taylor | |
| 4,460,244 A | 7/1984 | Cole et al. | |
| 4,583,094 A | 4/1986 | Mosier | |
| 4,805,828 A | 2/1989 | Witherell et al. | |
| 4,830,704 A | 5/1989 | Voss et al. | |
| 4,834,320 A | 5/1989 | Tyson | |
| 4,884,077 A | 11/1989 | Landt | |
| 4,921,054 A | 5/1990 | Voss et al. | |
| 4,952,941 A | 8/1990 | Landt | |
| 4,986,495 A | 1/1991 | Stromath et al. | |
| 5,015,083 A | 5/1991 | Wurst et al. | |
| 5,088,662 A | 2/1992 | Appleberry | |
| 5,119,236 A | 6/1992 | Fong et al. | |
| 5,216,611 A | 6/1993 | McElreath | |
| 5,301,510 A | 4/1994 | Glasser | |
| 5,311,097 A | 5/1994 | Mepham et al. | |
| 5,402,965 A | 4/1995 | Cervisi et al. | |
| 5,483,241 A | 1/1996 | Waineo et al. | |
| 5,548,515 A * | 8/1996 | Pilley et al. | 701/120 |
| 5,585,813 A | 12/1996 | Howard | |
| 5,644,777 A | 7/1997 | Meyer et al. | |
| 5,661,486 A | 8/1997 | Faivre et al. | |
| 5,748,136 A | 5/1998 | Fischer | |
| 5,936,552 A | 8/1999 | Wichgers et al. | |
| 6,018,698 A | 1/2000 | Nicosia et al. | |
| 6,085,129 A | 7/2000 | Schardt et al. | |
| 6,107,943 A | 8/2000 | Schroeder | |
| 6,121,899 A | 9/2000 | Theriault | |
| 6,154,151 A | 11/2000 | McElreath et al. | |

(Continued)

OTHER PUBLICATIONS

U.S. Appl. No. 10/941,616, filed Sep. 15, 2004, Woodell et al.

(Continued)

*Primary Examiner* — Michael J. Zanelli
(74) *Attorney, Agent, or Firm* — Matthew J. Evans; Daniels M. Barbieri

(57) ABSTRACT

An apparatus for detecting incursions for an aircraft and surface vehicles includes an incursion processor receiving ownship position from an ownship navigation processor, traffic information from a traffic surveillance processor, and obstacle information from an obstacle detector and generating alert information. The apparatus also includes a display processor receiving airport chart information and providing display information for displaying the alert information and airport chart information.

30 Claims, 20 Drawing Sheets

U.S. PATENT DOCUMENTS

| | | | | |
|---|---|---|---|---|
| 6,204,806 | B1 | 3/2001 | Hoech | |
| 6,208,284 | B1 | 3/2001 | Woodell et al. | |
| 6,236,351 | B1 | 5/2001 | Conner et al. | |
| 6,239,745 | B1 | 5/2001 | Stratton | |
| 6,366,836 | B1 | 4/2002 | Johnson | |
| 6,388,607 | B1 | 5/2002 | Woodell | |
| 6,388,608 | B1 | 5/2002 | Woodell et al. | |
| 6,424,288 | B1 | 7/2002 | Woodell | |
| 6,492,934 | B1 | 12/2002 | Hwang et al. | |
| 6,567,014 | B1 | 5/2003 | Hansen et al. | |
| 6,567,728 | B1 | 5/2003 | Kelly et al. | |
| 6,571,166 | B1 | 5/2003 | Johnson et al. | |
| 6,591,171 | B1 | 7/2003 | Ammar et al. | |
| 6,597,305 | B2 | 7/2003 | Szeto et al. | |
| 6,603,425 | B1 | 8/2003 | Woodell | |
| 6,606,545 | B1 | 8/2003 | McCall et al. | |
| 6,606,563 | B2 | 8/2003 | Corcoran, III | |
| 6,690,299 | B1 | 2/2004 | Suiter | |
| 6,694,249 | B1 | 2/2004 | Anderson et al. | |
| 6,822,617 | B1 | 11/2004 | Mather et al. | |
| 6,845,304 | B1 | 1/2005 | Young | |
| 6,850,185 | B1 | 2/2005 | Woodell | |
| 6,871,124 | B1 | 3/2005 | McElreath | |
| 6,876,906 | B1 | 4/2005 | Zellers et al. | |
| 6,879,280 | B1 | 4/2005 | Bull et al. | |
| 6,957,130 | B1 * | 10/2005 | Horvath et al. | 701/3 |
| 7,081,834 | B2 | 7/2006 | Ruokangas et al. | |
| 7,089,092 | B1 | 8/2006 | Wood et al. | |
| 7,109,912 | B1 | 9/2006 | Paramore et al. | |
| 7,109,913 | B1 | 9/2006 | Paramore et al. | |
| 7,138,619 | B1 | 11/2006 | Ferrante et al. | |
| 7,148,816 | B1 | 12/2006 | Carrico | |
| 7,196,329 | B1 | 3/2007 | Wood et al. | |
| 7,212,920 | B1 | 5/2007 | Bailey et al. | |
| 7,219,011 | B1 | 5/2007 | Barber | |
| 7,292,178 | B1 | 11/2007 | Woodell et al. | |
| 7,426,437 | B2 * | 9/2008 | Breed et al. | 701/301 |
| 2002/0089432 | A1 | 7/2002 | Staggs et al. | |
| 2002/0147544 | A1 | 10/2002 | Nicosia et al. | |
| 2002/0163461 | A1 | 11/2002 | Smithey | |
| 2003/0016156 | A1 | 1/2003 | Szeto et al. | |
| 2003/0225487 | A1 | 12/2003 | Robert et al. | |
| 2003/0227395 | A1 | 12/2003 | Zeineh | |
| 2006/0214816 | A1 * | 9/2006 | Schell | 340/961 |
| 2007/0067093 | A1 * | 3/2007 | Pepitone | 701/120 |
| 2008/0140269 | A1 * | 6/2008 | Naimer et al. | 701/7 |
| 2008/0275642 | A1 * | 11/2008 | Clark et al. | 701/208 |
| 2009/0009357 | A1 * | 1/2009 | Heen et al. | 340/825.49 |

OTHER PUBLICATIONS

Cassell, R., “Development of the Runway Incursion Advisory and Alerting System (RIAAS),” NASA/CR 2005-213759, Rannoch Corporation, May 2005, 30 pages.

Cassell, R. et al., “NASA Runway Incursion Prevention System (RIPS) Dallas-Fort Worth Demonstration Performance Analysis,” NASA/CR 2002-211677, Rannoch Corporation, Jun. 2002, 119 pages.

Green, David F., “Runway Safety Monitor Algorithm for Runway Incursion Detection and Alerting,” NASA/CR 2002-211416, Lockheed Martin Corporation, Jan. 2002, 43 pages.

Jones, Denise R., “Runway Incursion Prevention System Simulation Evaluation,” presented at 21st Digital Avionics Conference, Irvine, CA, Oct. 27-31, 2002, 12 pages.

McGrath, John K., Technical Standard Order, TSO-C115b, Airborne Area Navigation Equipment Using Multi-Sensor Inputs, Department of Transportation, Federal Aviation Administration, Sep. 30, 1994, 11 pages.

“Runway Safety Program,” FAA Order 7050.1, U.S. Department of Transportation, Nov. 2002, 21 pages.

Young, S.D. et al., “Runway Incursion Prevention: A Technology Solution,” presented at the Joint Meeting of the Flight Safety Foundation’s 54th Annual International Air Safety Seminar, the International Federation of Airworthiness’ 31st International Conference, and the International Air Transport Association, Athens, Greece, Nov. 5-8, 2001, cover p. and pp. 221-237.

Zipser, Edward J. et al., “The Vertical Profile of Radar Reflectivity of Convective Cells: A Strong Indicator of Storm Intensity and Lightning Probability?,” Dept. of Meteorology, Texas A&M University, College Station, Texas, American Meteorological Society, Aug. 1994, vol. 122, pp. 1751-1759.

* cited by examiner

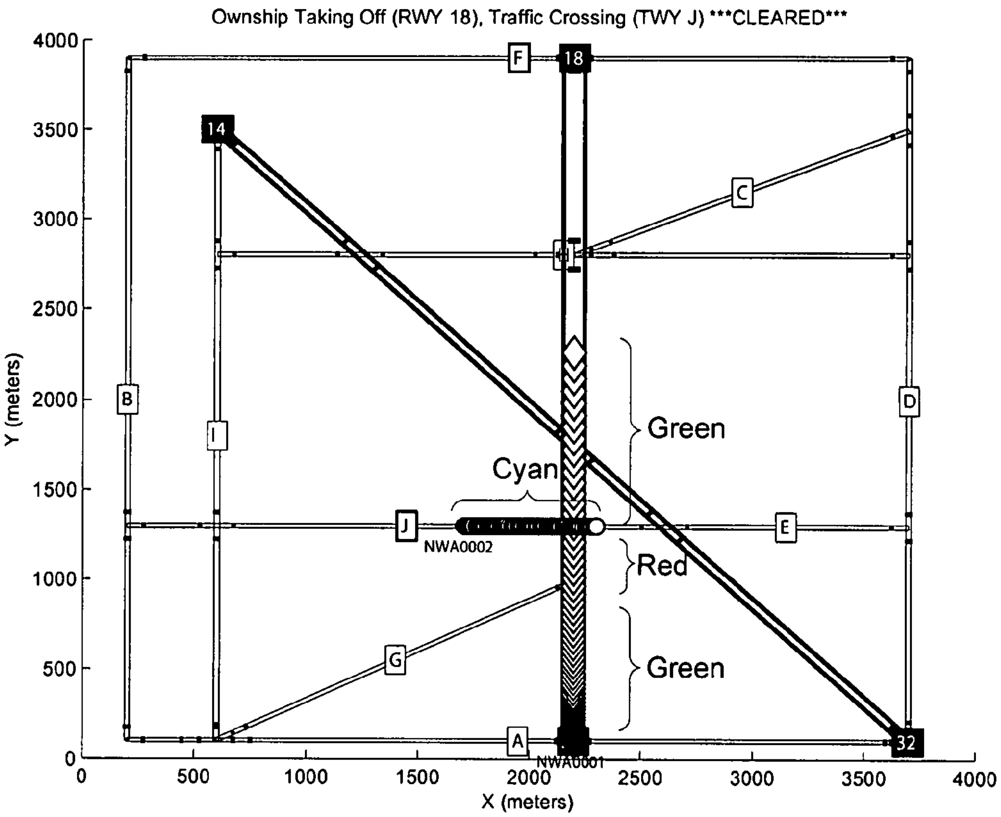
(a) Algorithm Output
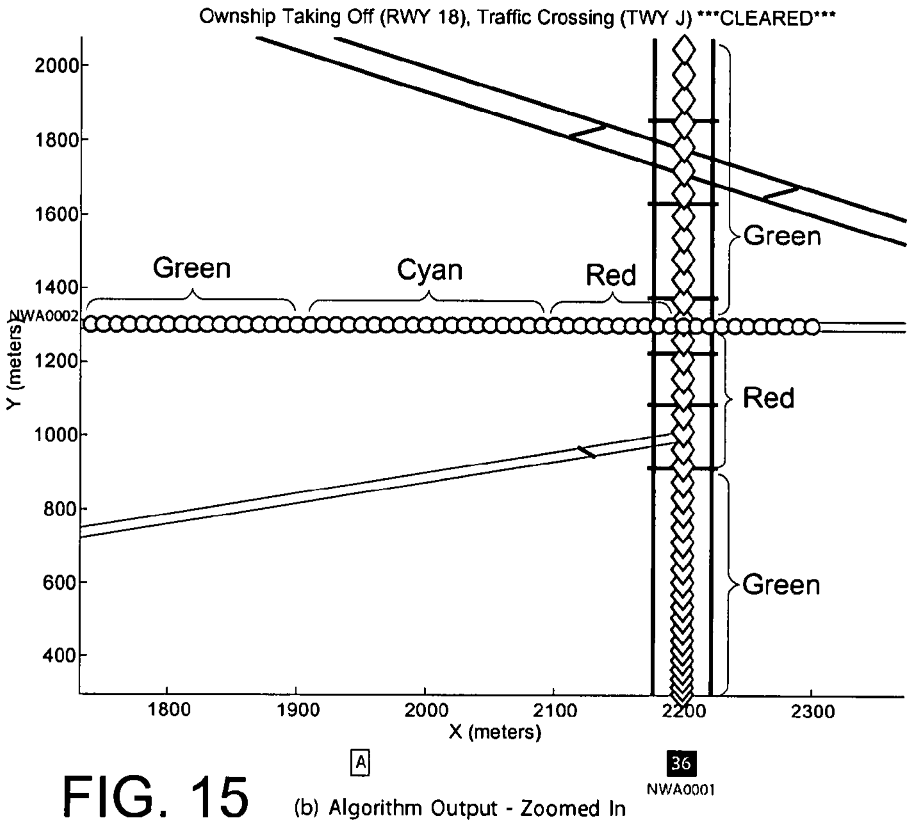
FIG. 15 (b) Algorithm Output - Zoomed In

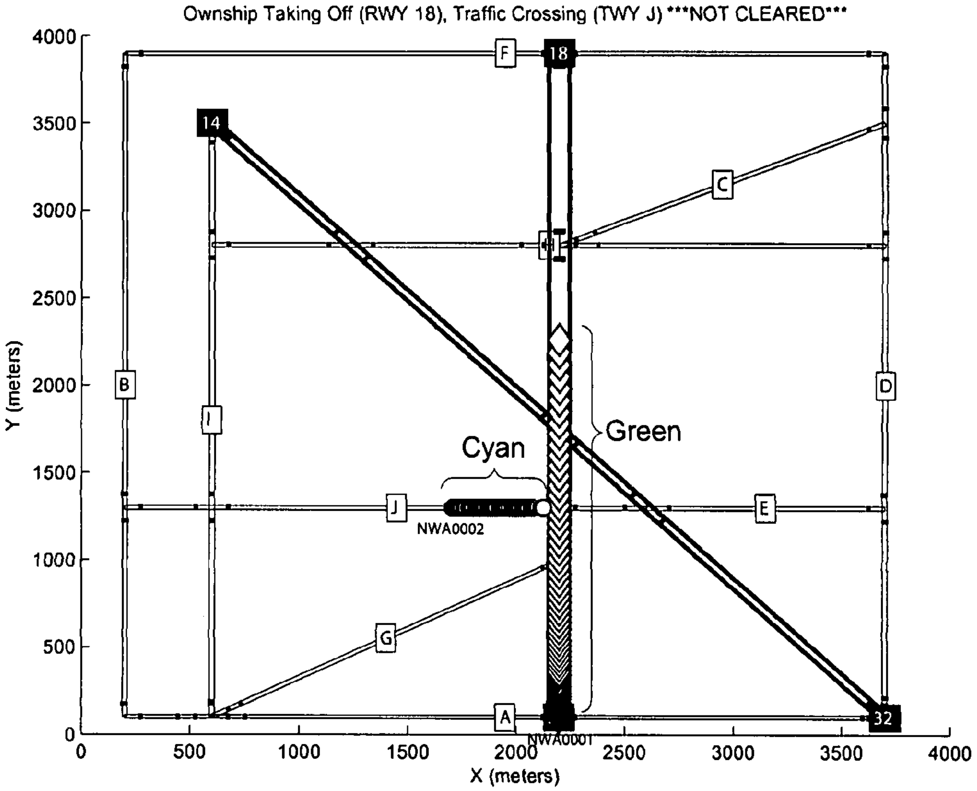
(a) Algorithm Output
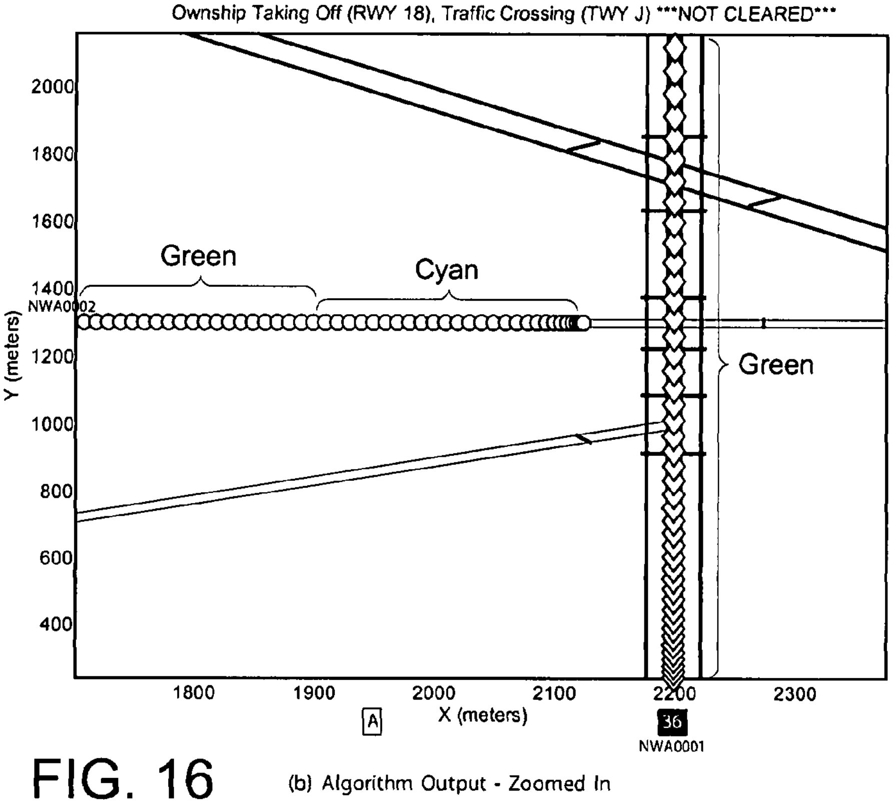
FIG. 16
(b) Algorithm Output - Zoomed In

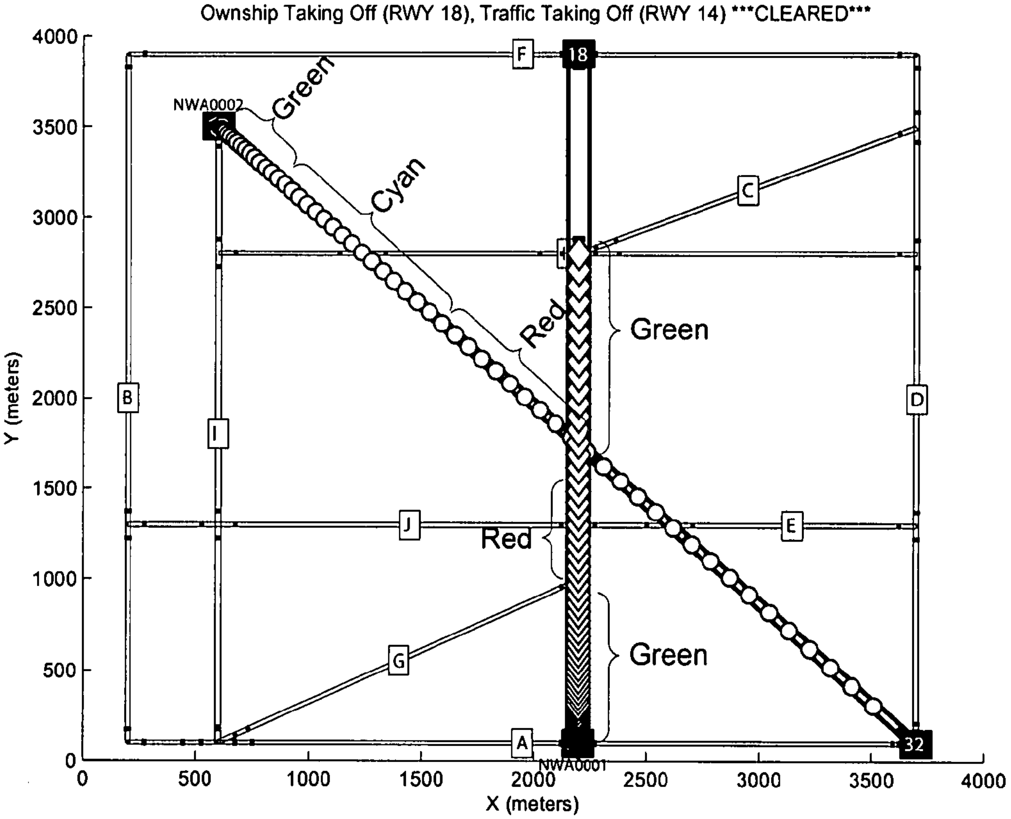
(a) Algorithm Output
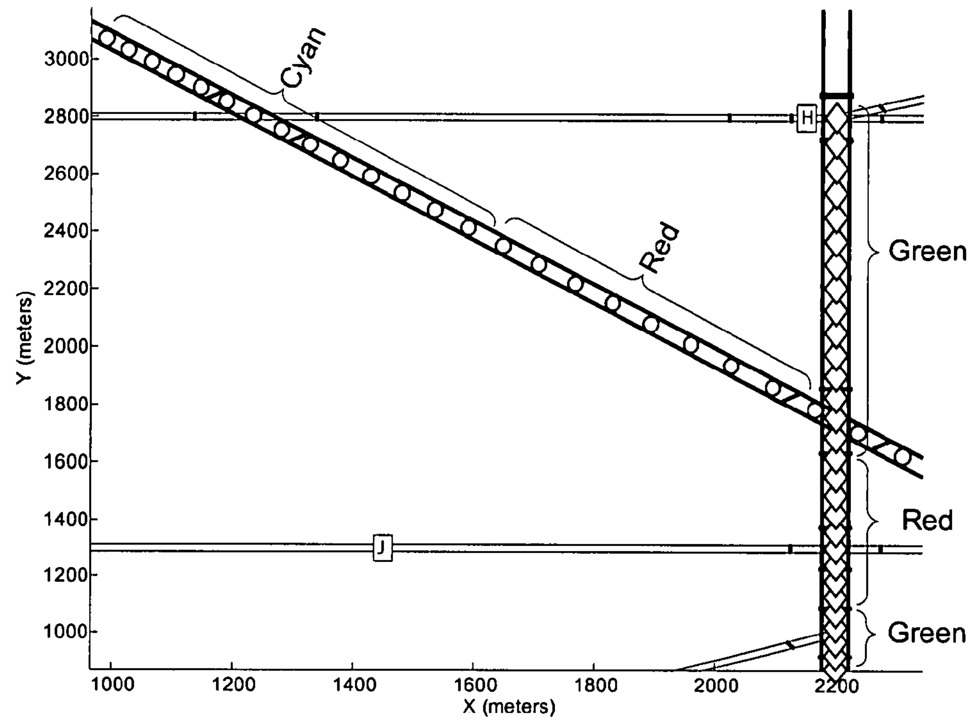
FIG. 17
(b) Algorithm Output - Zoomed In

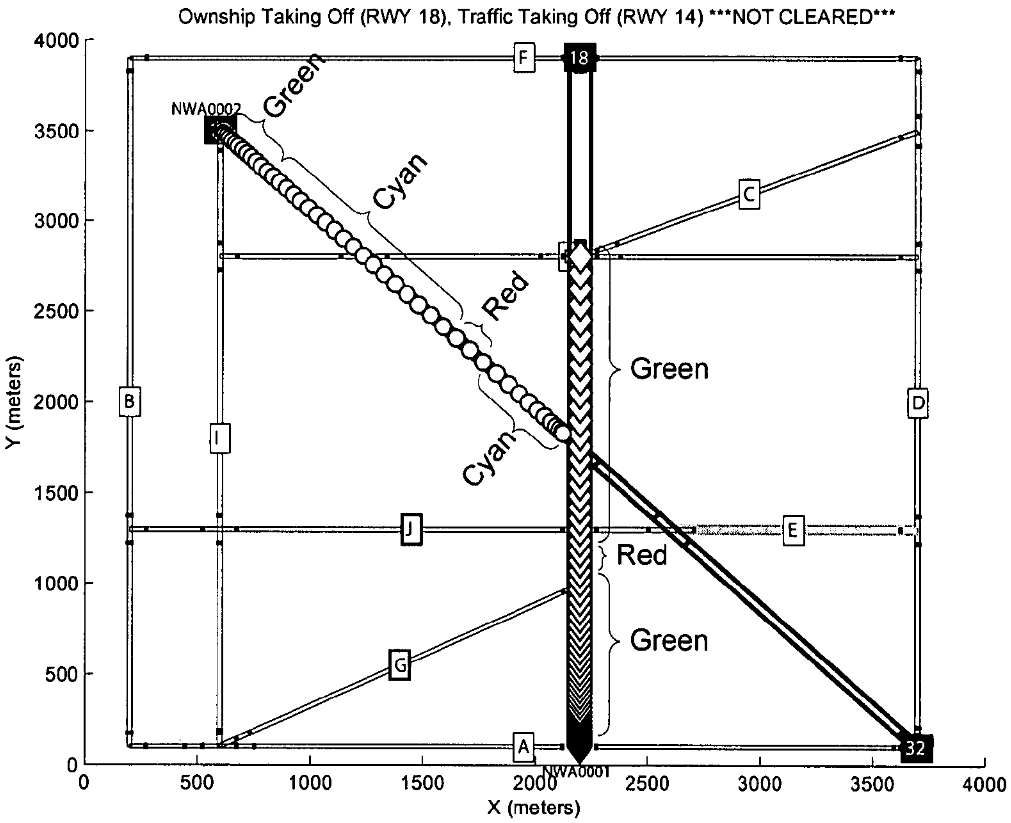
(a) Algorithm Output
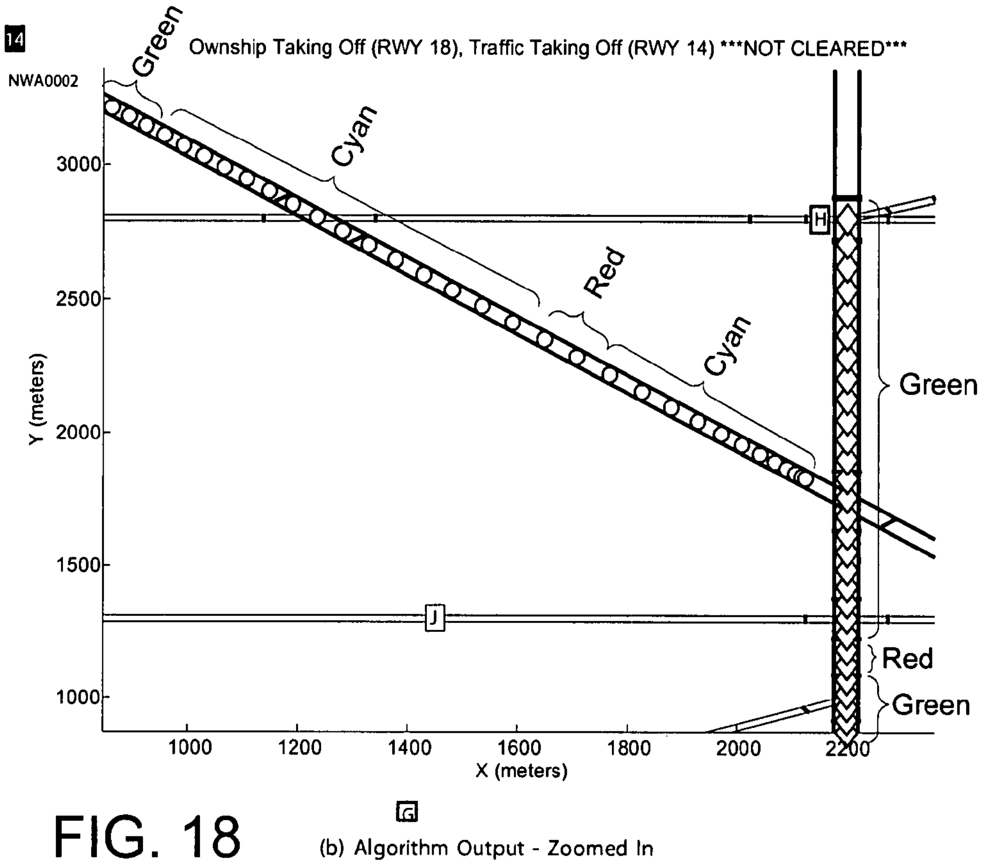
FIG. 18
(b) Algorithm Output - Zoomed In

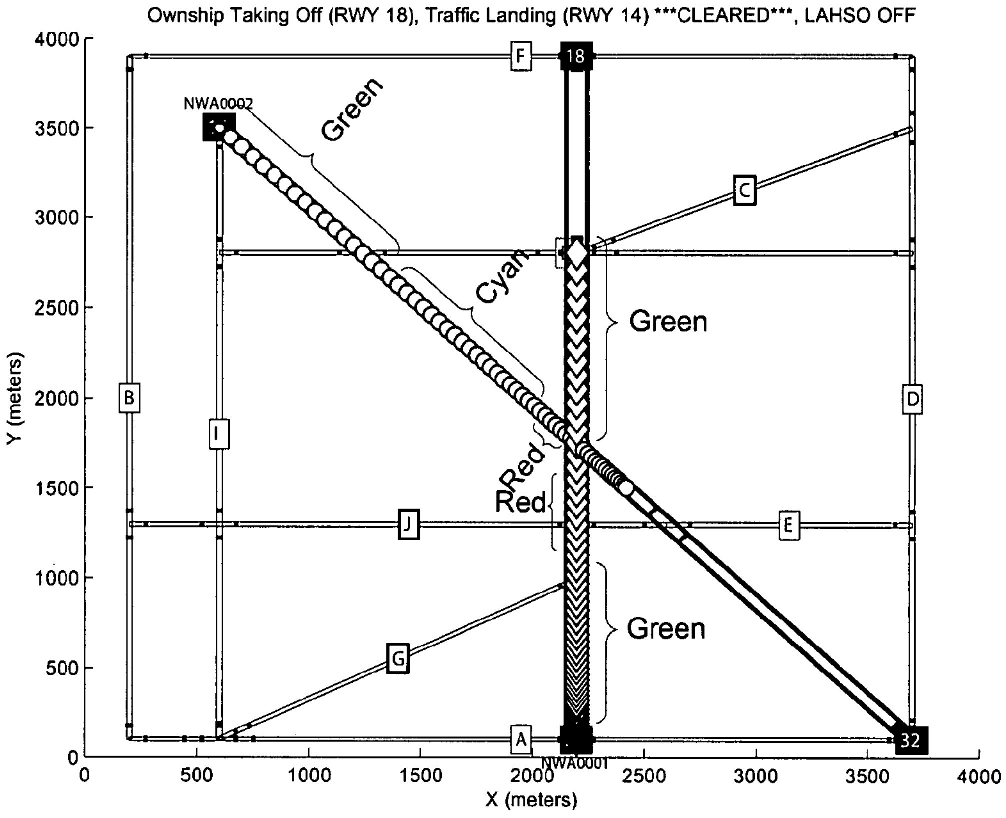
(a) Algorithm Output
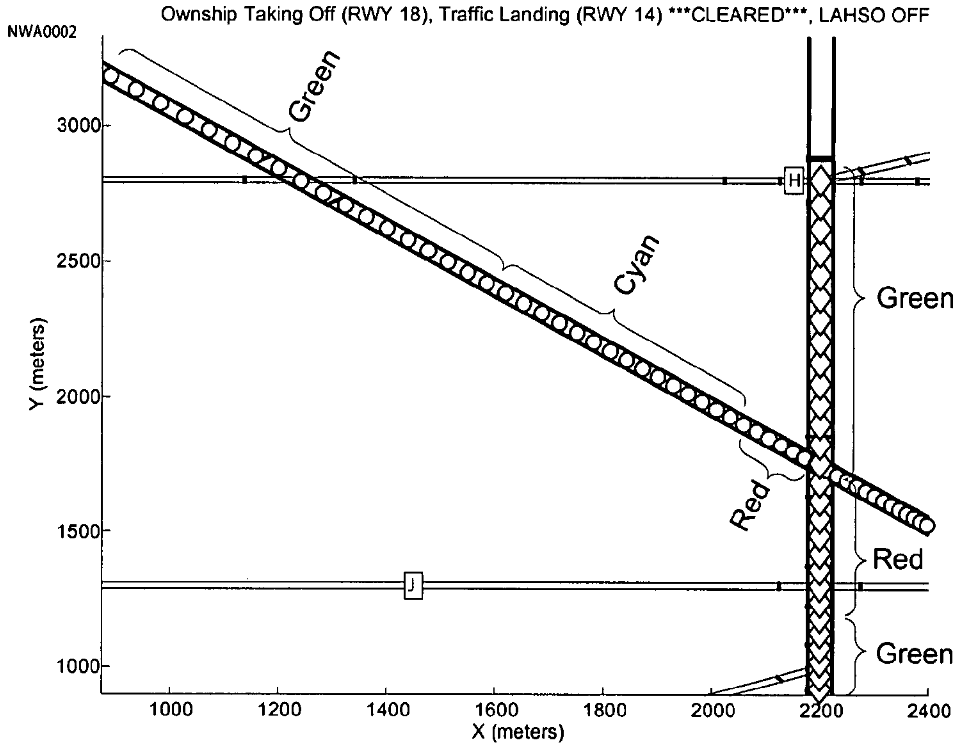
FIG. 19
(b) Algorithm Output - Zoomed In

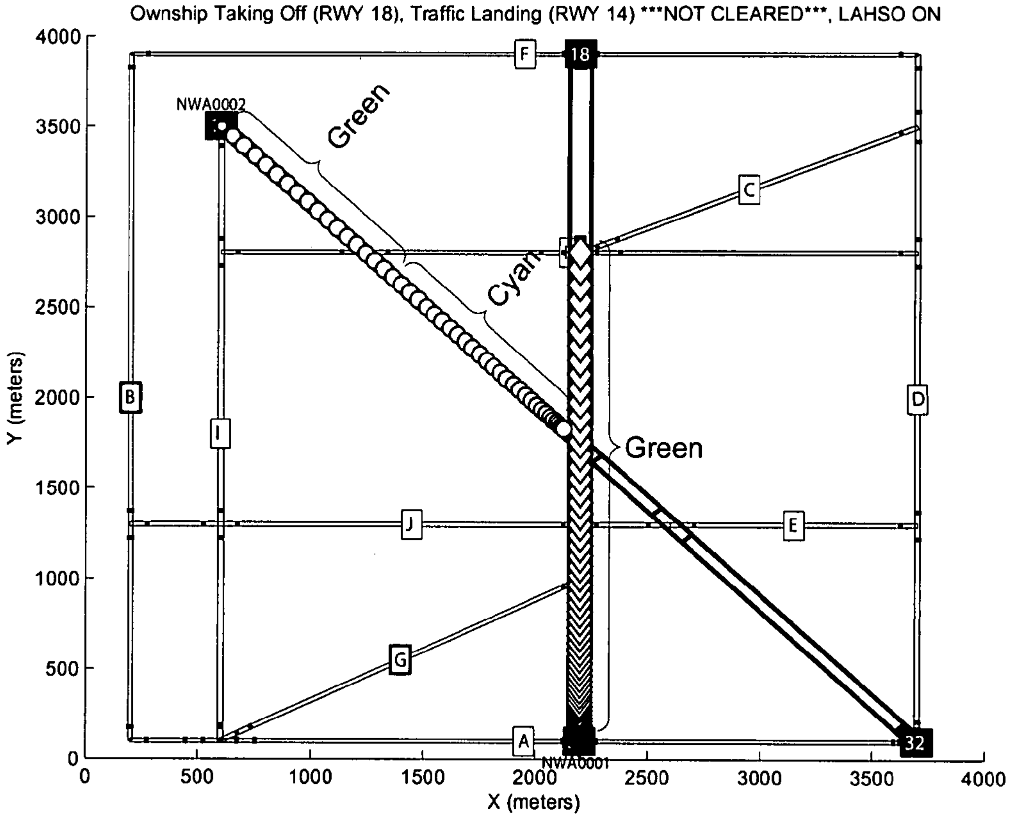
(a) Algorithm Output
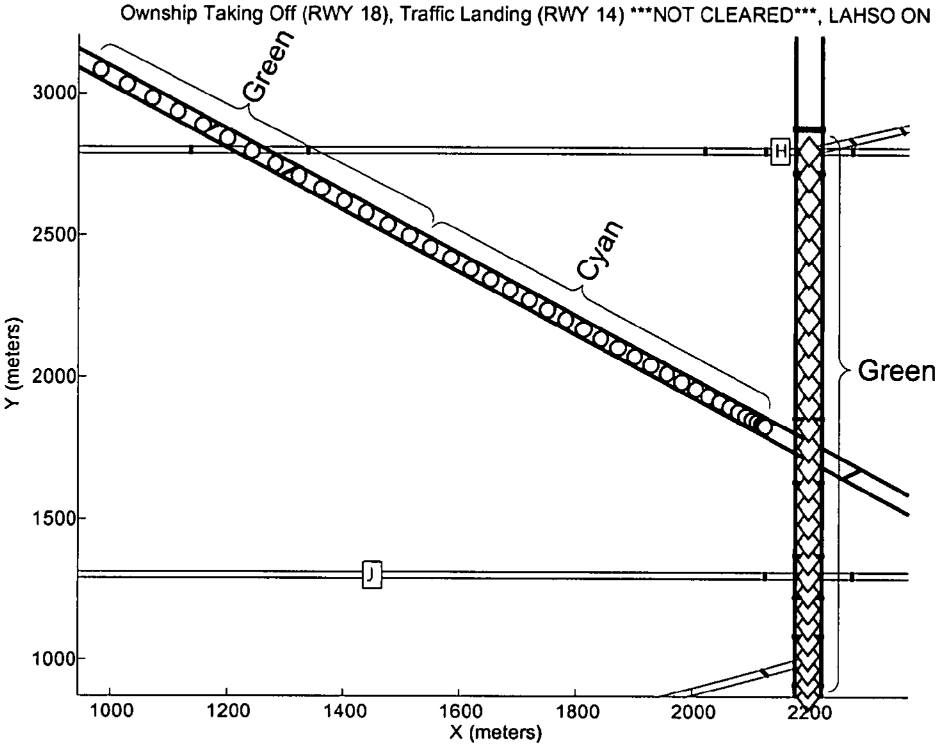
FIG. 20
(b) Algorithm Output - Zoomed In

RUNWAY AND AIRPORT INCURSION ALERTING SYSTEM AND METHOD

CROSS-REFERENCE TO RELATED APPLICATIONS

This application is related to the co-pending application Ser. No. 11/893,726, entitled, "ROBUST INCURSION ALERTING SYSTEM AND METHOD" and filed on an even date herewith and incorporated herein by reference. The application is assigned to the Assignee of the present application.

BACKGROUND

The present disclosure relates generally to the field of obstacle detection and alerting. The disclosure more specifically relates to alerting for early detection of incursion events to allow avoidance of hazardous encounters. The disclosure describes a system and algorithm for detecting vehicles, objects, and other conditions that are or may be a threat to safe vehicle movements on the airport surface and providing an appropriate alert such that the vehicle operator, controller, control system, or automation may take action to reduce the likelihood of a potential collision.

Incursion alerting systems, such as runway incursion alerting systems, are utilized to determine if an obstacle is in the path of an aircraft or other vehicle. Conventional runway incursion alerting systems are generally one of two types. The first type utilizes signals cooperatively provided from the obstacle on or approaching the runway; the second type utilizes radar, electro optic, or electromagnetic signals to actively sense the presence of an obstacle on or approaching the runway without the obstacles' active cooperation.

The first type requires equipment operating on the obstacles, or utilizes some form of ground-based infrastructure that senses, detects, and informs the aircraft flight crew or controllers. The aircraft that is to be protected relies on operating equipment that is not solely on the ownship aircraft. These systems are not stand-alone systems.

The second type requires neither ground infrastructure nor the obstacle to be equipped in a special way. These are stand-alone systems. Stand-alone systems treat the obstacle as a target. The obstacle is detected as being a source or reflector of electro optic, electromagnetic, or radio frequency energy. Radar, light detection and ranging (LIDAR) systems, forward looking infrared (FLIR) systems, and optical camera based systems are examples of sensor systems used as part of this stand-alone obstacle detection system type.

Conventionally, the first type of runway incursion alerting system relies upon cooperative signals, which may include, for example, traffic alert and collision avoidance system (TCAS), and Automatic Dependent Surveillance (ADS) systems that are broadcast (ADS-B) or re-broadcast (ADS-R).

TCAS systems are required for all airliners flying in the United States air space today. TCAS devices have been designated to interrogate transponders of other aircraft, sometimes referred to as intruder aircraft. The TCAS system evaluates the threat of mid-air collision with the other aircraft and coordinates an avoidance maneuver for the aircraft. TCAS systems have been developed to reduce the likelihood of a mid-air collision, but have not been developed to reduce the likelihood of a collision on the airport surface, as is the case for the runway incursion alerting system.

ADS-B and ADS-R systems are capable of providing position, velocity, status, and identifier information broadcast from aircraft or other surface vehicles at regular intervals using information obtained from ground-based and satellite-based positioning system signals (e.g., LORAN, DME, and GPS) and onboard systems. ADS-B systems may use transponders (including, for example, Mode S, Universal Access Transceiver (UAT), and VHF Data Link (VDL) mode 4) and provide transmissions at regular intervals. ADS-R systems are ground systems that receive ADS-B broadcasts on a first data link and re-transmit the information onto one or more other data links.

In an ADS-B system, a Mode S transponder may be disposed in a first aircraft that regularly emits a squitter message. The squitter message is a radio frequency (RF) signal that is periodically generated by the radio-based transponder and broadcast for reception by both ground and aircraft systems that want to monitor and track the emitting aircraft's state. In an ADS-B system there is no requirement for a reply to the ADS-B squitter message.

In one conventional runway obstacle detection system of the first-type, objects which may enter a runway, such as other aircraft, emergency vehicles, maintenance vehicles, runway tugs, baggage carts, etc., may carry transponders which provide location information. The location information can be generated from a navigation sensor, such as a Global Navigation Satellite System (GNSS) receiver (e.g., in an ADS-B type system). The transponders may transmit information that is received and processed by a centralized control system on the ground which determines whether the object is on or near the runway. The location information can be determined directly on the aircraft or be provided to the aircraft from the centralized control system.

Such a system requires that all objects which would potentially incur the runway space would be equipped with a transponder and all transponders remain functioning properly. In many situations, such as in underdeveloped regions, for example, in third world countries, or small airports and the like, sufficient infrastructure may not be available to support equipping each aircraft, ground vehicle, and baggage cart with a transponder and to have an appropriate central control system. Further, such systems cannot provide transponders to obstacles that cannot be tagged. For example, deer and other large animals may present a hazard if they wander onto a runway.

In another conventional runway obstacle detection system, land-based radar systems are used to detect runway obstacles. Land-based systems, including for example Airport Surface Detection Equipment (ASDE), require infrastructure at each airport and can be susceptible to similar difficulties associated with airborne-based obstacle detection systems. ASDE systems typically include ground primary radar, which typically operate in the 9 to 15 GHz range. Land-based systems may transmit the position and other information for traffic and obstacles using Traffic Information Services—Broadcast (TIS-B). A land-based positioning system is being considered to determine the location of aircraft on the airport surface which uses signal transmission times as detected by multiple ground receivers, as opposed to using radar or GNSS systems to the determine location of vehicles. Such a system is called a multilateration system and it uses ground-based equipment to receive signals (e.g., secondary surveillance radar (SSR) transmissions) that are transmitted by suitably equipped aircraft. NASA is developing a runway incursion prevention system (RIPS) based upon ADS-B equipped aircraft, an airport database, and a multilateration system.

Conventional incursion alerting systems of the first and second-type have disadvantages. For example, ADS-B-type runway incursion alerting systems cannot provide protection against vehicles or other obstacles that are not equipped with ADS-B transponders. If construction equipment does not include an ADS-B transponder, that equipment does not appear as an obstacle in an ADS-B system. Although aircraft-based weather radar systems and other sensors can detect obstacles that do not include transponders, weather radar systems and other sensors are typically not able to duplicate the positional accuracies, detection rates, and low false alarm rates associated with ADS-B-type systems. Further, weather radar systems and other sensors may not be able to detect obstacles that are shielded by other solid obstacles or obstacles that are susceptible to inaccurate detection by radar or other sensor techniques.

Therefore what is needed is a runway incursion alerting system and algorithm that processes the ownship, traffic, obstacle, and airport data to compute runway incursion alerts and advisories for the crew. Also needed is a system and algorithm that accounts for the characteristics and quality (e.g., accuracy and integrity) of the enabling technologies. Also needed is a system and algorithm capable of being extended to new airport layouts, taxiways operations, and that can handle most runway and taxiway incursion scenarios. There is also a need for a runway incursion alerting system that integrates sensor and data link information from multiple aircraft subsystems to increase the accuracy and integrity of runway incursion detection.

SUMMARY

One embodiment of the disclosure relates to an apparatus for detecting incursions for an aircraft or other airport surface vehicle. The apparatus includes a runway incursion processor receiving an ownship position from an ownship navigation processor, traffic information from a traffic surveillance processor, and obstacle information from an obstacle detector in order to generate incursion alert information. The apparatus also includes a display processor receiving airport chart information and providing display information for displaying the alert information and aircraft chart information.

Another embodiment of the disclosure relates to a method of detecting an incursion for a first aircraft. The method includes the steps of providing an airport layout associated with an airport; locating other traffic aircraft or surface vehicles on or in the vicinity of the airport; obtaining rules for alert generation; obtaining the current state of the ownship; obtaining the current state of traffic and obstacles; and computing incursion alerts based upon the operational and alerting rules; the current and/or predicted states of ownship, traffic, and obstacles; the airport layout; and the locations of the ownship, traffic, and obstacles.

Another embodiment of the disclosure relates to a system for providing alert information in an aircraft environment. The system includes a real-time sensor interface for receiving obstacle information from at least one real-time sensor. The system also includes a traffic surveillance interface for receiving traffic information from at least one ground-based infrastructure type system. The system also includes a processor for determining the alert information based upon location, an airport chart, the traffic information and the obstacle information.

BRIEF DESCRIPTION OF THE DRAWINGS

FIG. 15 is a schematic diagram that illustrates an output of the runway incursion algorithm of FIG. 3 in a first scenario according to an exemplary embodiment.

FIG. 16 is a schematic diagram that illustrates an output of the runway incursion algorithm of FIG. 3 in a second scenario according to an exemplary embodiment.

FIG. 17 is a schematic diagram that illustrates an output of the runway incursion algorithm of FIG. 3 in a third scenario according to an exemplary embodiment.

FIG. 18 is a schematic diagram that illustrates an output of the runway incursion algorithm of FIG. 3 in a fourth scenario according to an exemplary embodiment.

FIG. 19 is a schematic diagram that illustrates an output of the runway incursion alerting algorithm of FIG. 3 in a fifth scenario according to an exemplary embodiment.

FIG. 20 is a schematic diagram that illustrates an output of the runway incursion algorithm of FIG. 3 in a sixth scenario according to an exemplary embodiment.

DETAILED DESCRIPTION OF THE PREFERRED EMBODIMENTS

The Runway and Airport Incursion Alerting system is preferably configured to detect an incursion anywhere on the airport surface and provide an alert before the incursion results in an accident such that intervention by the pilots/flight crew, vehicle operators, controllers, or control system may reduce the likelihood that the incursion results in an accident.

Implementing an incursion alerting algorithm that works well for all areas of the airport surface is challenging. Thus, a preferred embodiment can include an algorithm that detects incursions and provides alerts to an aircraft flight crew for incursions caused by aircraft, surface vehicles, and other obstacles that are on a runway, in the vicinity of a runway (e.g., on nearby taxiways), or are expected to soon be on the runway (e.g., an aircraft on the final stages of an approach).

Figure 1:
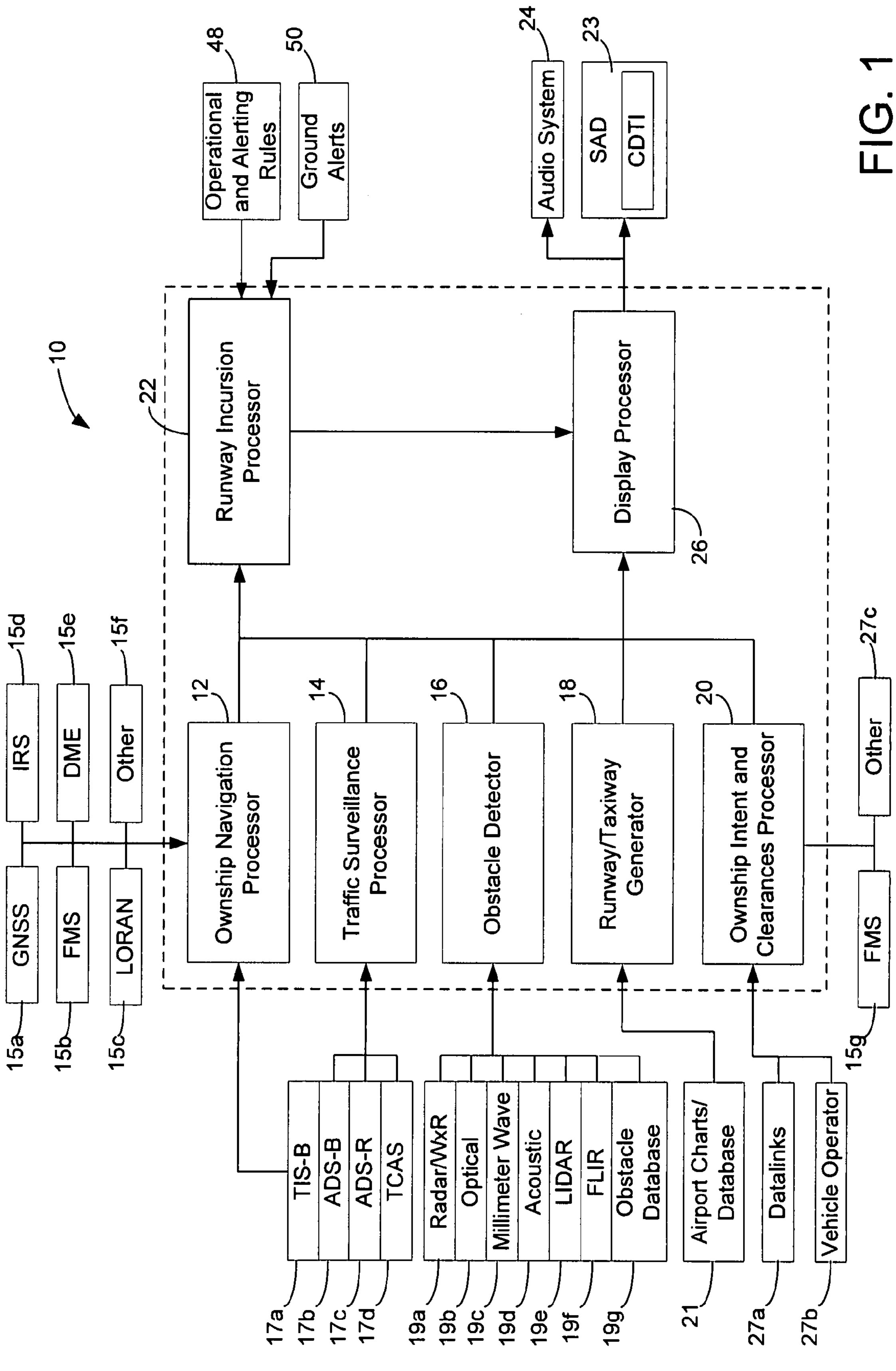
FIG. 1 is a block diagram of a runway incursion alerting system according to an exemplary embodiment.

Referring to FIG. 1, a runway incursion alerting system 10 can use an algorithm or software routine to implement various operations as described below. Preferred embodiments of the algorithm are implemented in software and operate on a computing platform. The computing platform can be provided within an aircraft. Embodiments described below are provided as examples only and do not limit the scope of the claims of this application.

The algorithm advantageously can minimize the rate of missed and false alerts. In one preferred embodiment, the algorithm advantageously provides an aircraft protection zone associated with the aircraft and an obstacle protection zone that are applied to airport surface operations.

The aircraft protection zone can be in the form of an ellipse around the aircraft. The ellipse is sized according to inputs to the algorithm. The inputs relate to the characteristics and quality (e.g., accuracy and integrity constraints) associated with sensors used to measure position and velocity.

The algorithm preferably receives inputs associated with the position, the velocity, and the intent of ownship, traffic, and obstacles as well as the airport layout, and provides outputs as a set of alerts and advisories. The aircraft or ownship protection zone is defined by error characteristics and quality information associated with the sensors measuring ownship position and velocity. For example, the accuracy of the GPS or GPS that is augmented by Wide Area Augmentation Systems (WAAS) or Local Area Augmentation Systems (LAAS) is provided as a factor to determine the size of the aircraft protection zone.

Further, protection zones may be provided for traffic and obstacles. The protection zones may be elliptical and may be determined using the characteristics and quality information that is available for each target. Such information, including, for example, accuracy and integrity, is available from various surveillance sources, including Automatic Dependent Surveillance-Broadcast (ADS-B), Automatic Dependent Surveillance—Rebroadcast (ADS-R). Traffic Information Services-Broadcast (TIS-B), Traffic Collision Avoidance System (TCAS), and other obstacle sensors. For example, ADS-B, ADS-R, and TIS-B provide messages that contain the accuracy, integrity containment region, and surveillance integrity level associated with the location of the particular traffic object.

Further still, the algorithm can account for the accuracy constraints of an airport database and its determination of runway and taxiway centerlines and edges.

Advantageously, applicants believe that the algorithm provides a robust method that incorporates the characteristics and quality (e.g., accuracy and integrity) of the sensors and information associated with runway incursion system 10. The preliminary protection zones can also be dependent upon position and velocity. The algorithm can be combined with a two level alerting scheme for high level alerting robustness and minimal false alerts.

Referring to FIG. 1, a runway incursion alerting system 10 is configured to detect a runway incursion and provide an alert before the incursion results in an accident such that subsequent intervention by the pilots, vehicle operators, controllers, or control system may reduce the likelihood that the incursion results in an accident. Runway incursion alerting system 10 generally includes an ownship navigation processor 12, a traffic surveillance processor 14, an obstacle detector 16, a runway/taxiway generator 18, an ownship intent and clearances processor 20, a runway incursion processor 22, and a display processor 26. System 10 can be implemented in software execution or a computing platform, such as an aviation computing resource (e.g., a traffic computer, surveillance system, integrated avionics module, common computer module), a general purpose processor, an electronic flight bag, or a portable device. In a preferred embodiment, system 10 advantageously receives information from a variety of sources including infrastructure based sources, real-time sensors, airport databases, ownship location systems, ownship state determination systems, data link information, etc. and applies airport specific operational and alerting rules to generate alerts and/or advisories. In one preferred embodiment, the alerts are displayed on a map showing an airport layout.

Ownship navigation processor 12 is configured to collect and/or process data from available sensors to compute the ownship state. Ownship state can be determined using at least one of position, velocity, acceleration, time, altitude, heading, vehicle size, systems status, phase of operation, etc. The sensors may include one or more Global Navigation Satellite System (GNSS) 15*a*, Flight Management System (FMS) 15*b*, LOng RAnge Navigation (LORAN) system 15*c*, Inertial Reference System (IRS) 15*d*, Distance Measuring Equipment (DME) system 15*e*, or other system 15*f* that are used to determine ownship state, including any combination thereof. GNSS systems are meant to encompass at least one satellite constellation (e.g., Global Positioning System (GPS), Global Navigation Satellite System (GLONASS), Galileo, etc.), and may also include one or more augmentation system (e.g., Satellite Based Augmentation System (SBAS), Ground Based Augmentation System (GBAS), Ground-based Regional Augmentation System (GRAS)). Ownship navigation processor 12 may also receive ownship information from a Traffic Information Services—Broadcast (TIS-B).

Traffic surveillance processor 14 is configured to collect and/or process traffic information that is transmitted by other aircraft, ground vehicles, and ground systems to compute traffic states that may include position, velocity, acceleration, time, altitude, heading, aircraft/vehicle size, systems status, phase of operation, etc. Traffic data may be obtained from broadcast mechanisms, such as, TIS-B 17*a*, Automatic Dependent Surveillance—Broadcast (ADS-B) 17*b*, and Automatic Dependent Surveillance—Rebroadcast (ADS-R) 17*c*, or via Traffic Alert and Collision Avoidance System (TCAS) 17*d*, or any combination thereof.

Obstacle detector 16 is configured to collect and/or process data to compute location and/or size of obstacles on or near a runway. Obstacle detector 16 may collect data from a number of sensors including a weather radar (W×R) system 19*a*, an optical camera system (e.g., a television camera) 19*b*, a millimeter-wave radar system 19*c*, an acoustic system 19*d*, a LIght Detection and Ranging (LIDAR) system 19*e*, a Forward Looking Infrared Radar (FUR) 19*f*, obstacle database 19*g*, or any combination thereof. The obstacle database 19*g* may be in an on ownship database, data loaded from a storage media, manually entered, and/or received via wireless data link (e.g., TIS-B). According to one exemplary embodiment, one or more of the sensors may be real-time sensors. Traffic and obstacles are collectively termed as "targets" from here on.

Runway/taxiway generator 18 is configured to process airport charts data from a database 21 to compute the centerline, width, end points, length, and/or direction of each runway and/or taxiway of the airport. Runway/taxiway generator 18 may also compute the available hold-lines of each runway or taxiway. According to one exemplary embodiment, the airport charts/database 21 may be resident on an aircraft, while in another exemplary embodiment, the airport charts/database 21 may be loaded on to the aircraft (e.g., via wireless or wired transmission).

Ownship intent and clearances processor 20 is configured to process the available ownship intent data, ownship clearance data, and other relevant prediction information. The ownship clearance may be entered by the aircraft/vehicle operator via an interface 27*b* or may be obtained automatically via one or more datalinks 27*a* that may be connected to air traffic controllers, ground controllers, or other controller that is controlling aircraft and other vehicle movements on the airport surface, such as the Controller-Pilot Data Link Communications (CPDLC) link. Other relevant prediction information may be available from FMS 15*g* or from other onboard systems 27*c*.

Runway incursion processor 22 is configured to process incoming information from ownship navigation processor 12, traffic surveillance processor 14, obstacle detector 16, runway/taxiway generator 18, ownship intent and clearances processor 20, predefined operational and alerting rules 48, and/or existing ground alerts 50 to generate a set of alerts and advisories for runway operation. According to another exemplary embodiment, the runway incursion alerting system 10 may be capable of accepting "Operational and Alerting Rules" 48 to handle unique operations at an airport. These "Operational and Alerting Rules" 48 may be a standalone database, associated with the airport charts/data base 21, provided via data link information 27*a* (including, for example, the CPDLC), manually entered by the aircraft/vehicle operator 27*b*, or any combination thereof. These rules provide an indication of the specific operational procedures and restrictions in effect at each airport, including for example, special operational procedures (e.g., Land And Hold Short Operations (LAHSO)), Notices to Airmen (NOTAMS), closed runways, and closed taxiways.

The runway incursion processor 22 is configured to process the runway incursion alerting algorithm advisories and/or alerts and convert them into a format used by display processor 26. The runway incursion processor 22 may also process currently existing ground alerts 50 (e.g., previously known incursion alerts) for use by display processor 26.

Display processor 26 is configured to process airport surface map data, situational awareness data (e.g., ownship information, target information, obstacle information, etc.), and/or alert and advisory data. Display processor 26 typically defines the appropriate symbology and interfaces with a Situational Awareness Display (SAD) 23 (e.g., a Cockpit Display of Traffic Information (CDTI)) and audio system 24.

According to one exemplary embodiment, runway incursion alerting system 10 may alert of a possible incursion as follows:

1. An airport surface map may be displayed on the SAD 23 if the ownship is in the vicinity of a runway, or whenever the ownship is on the airport surface.

2. Runway-to-use and relevant hold-short lines may be highlighted, if available.

3. Current or predicted ownship position may be displayed on the airport surface map.

4. Current or predicted ownship velocity, heading/track and/or vertical velocity may also be displayed.

5. Current or predicted traffic position for all traffic within a pre-defined, user selectable, or automated range or region may be shown on the SAD 23.

6. Current or predicted obstacle state information may be displayed, if available.

7. Intended ownship airport surface movement route (including pushback, taxi, takeoff, and/or landing runway and taxi) route information may be displayed, if available. Clearance information, e.g., highlighting the portion of the taxi route for which the aircraft is cleared to move without receiving a subsequent clearance, may be displayed, if available.

8. One or more intended traffic taxi route information may be displayed, if available. Clearance information, e.g., highlighting the portion of the taxi route for which the traffic is cleared to move without receiving a subsequent clearance, may be displayed, if available.

9. "Out-of-Conformance Alert" may be displayed if the ownship is out-of-conformance with either the intended taxi route, intended takeoff runway, clearances, the operational and alerting rules, or the airport operational restrictions.

10. "Traffic Out-of-Conformance Alert" may be displayed if traffic is out-of-conformance with either its intended taxi route, intended takeoff runway, clearances, the operational and alerting rules, or the airport operational restrictions. Such an alert is preferably only displayed for traffic that is operationally relevant to ownship, as determined by the operational and alerting rules.

11. "Obstacles Out-of-Conformance Alert" may be displayed if an obstacle is out-of-conformance with either its intended taxi route, intended takeoff runway, clearances, the operational and alerting rules, or the airport operational restrictions. Such an alert is preferably only displayed for obstacles that are operationally relevant to ownship, as determined by the operational and alerting rules.

12. If the current ownship state is incurred upon or causes an incursion with any of the targets or obstacles, a visual "Conflict-Alert" may appear on the SAD 23 and may be complemented by an audio alert.

13. If a predicted ownship state is incurred upon or causes an incursion with any of the targets or obstacles, a visual "Caution-Advisory" may appear on the SAD 23 and may be complemented by an audio advisory.

14. If the ownship or the conflicting target maneuvers to avoid the conflict, the "Conflict-Alert/Advisory" may be removed.

15. The runway incursion algorithm may terminate if the ownship is no longer in the vicinity of a runway.

Figure 2:
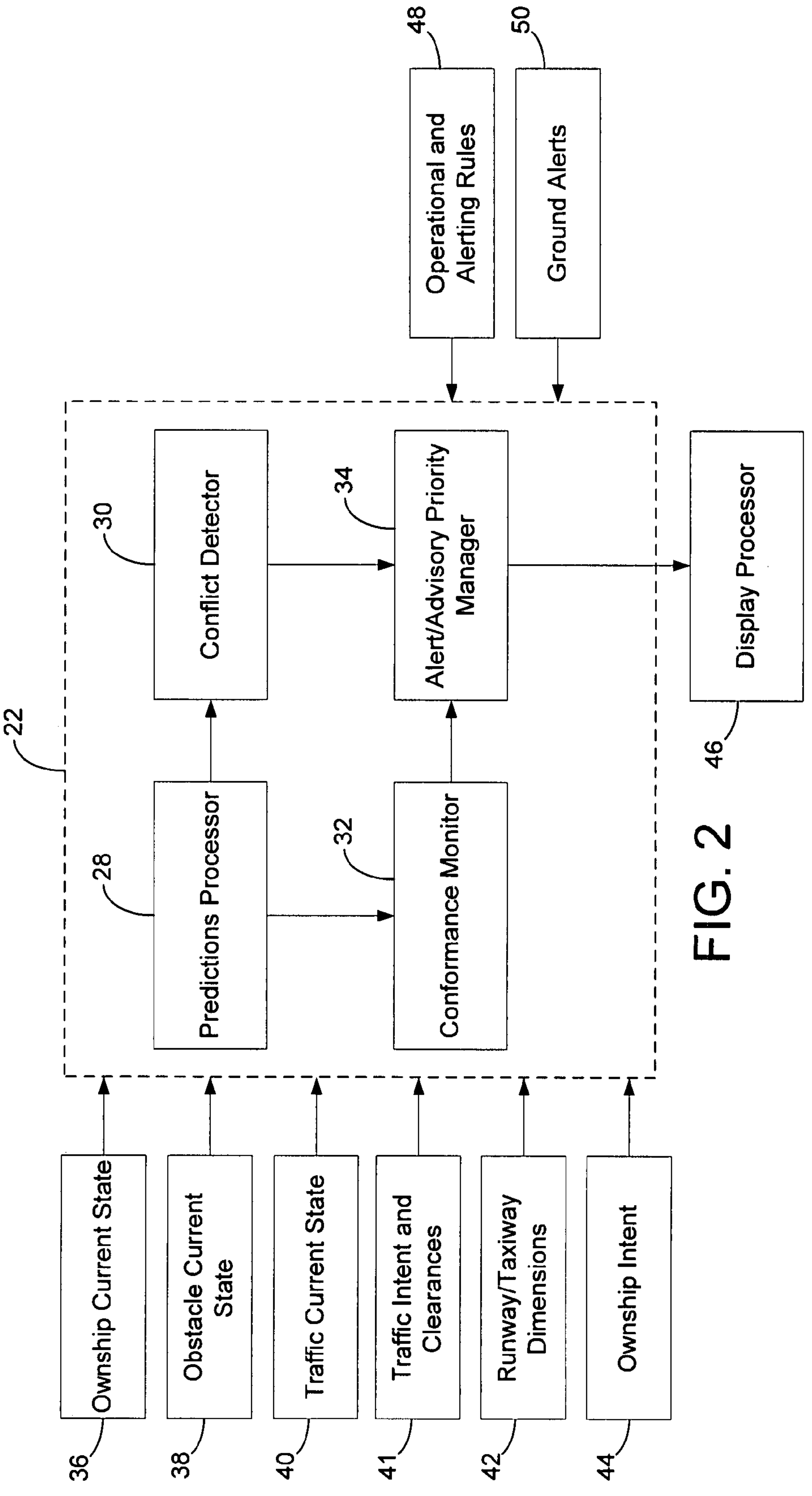
FIG. 2 is a block diagram of the runway incursion processor of the runway incursion alerting system of FIG. 1 according to an exemplary embodiment.

Referring to FIG. 2, runway incursion processor 22 is configured to process ownship, target, and airport data to compute alerts and advisories for the aircraft crew. Runway incursion processor 22 generally includes a predictions processor 28, a conflict detector 30, a conformance monitor 32, and an alert/advisory priority manager 34. The runway incursion processor 22 may be an aviation computing resource, a general purpose processor, an electronic flight bag, or a portable computing device.

Predictions processor 28 is configured to predict the future states of ownship, traffic, and obstacles based on the ownship current state 36 from ownship navigation processor 12, the obstacle current state and intent (if known) 38 from obstacle detector 16, and the traffic current state and intent 40 from traffic surveillance processor 14, and ownship intent 44 from the ownship intent and clearances processor 20. Current and predicted ownship, traffic, and obstacle states are provided to the conflict detector 30 for determination of incursion alerts or advisories.

Current and predicted ownship states are also provided to the conformance monitor 32 so that they may be assessed for ownship conformance to the intended taxi route, intended takeoff runway, intended landing runway, clearances, the operational and alerting rules, airport operational restrictions, and/or the runway and taxiway dimensions needed to conduct safe operations (e.g., runway is too short for takeoff or landing).

Current and predicted traffic states may also be provided to the conformance monitor 32 so that they may be assessed for traffic conformance to the intended taxi route, intended takeoff runway, intended landing runway, clearances, the operational and alerting rules, airport operational restrictions, and/or the runway and taxiway dimensions needed to conduct safe operations (e.g., runway is too short for takeoff or landing).

Conflict detector 30 is configured to receive the current and predicted ownship, traffic, and obstacle states from predictions processor 28 and determine whether there is or will be a conflict on the runway, taxiway, or other airport surface movement region between a protection zone around the ownship and the protection zones around traffic and obstacles.

Conformance monitor 32 is configured to monitor ownship conformance with operational and alerting rules 48, runway or taxiway dimensions 42 received from runway/taxiway generator 18, with ownship intent and clearances 44 (e.g., is the ownship on the correct route, has the ownship violated any clearances like crossing a hold-line prior to receiving appropriate clearance, etc.) received from ownship intent and clearances processor 20, based on ownship current and/or predicted states received from the predictions processor 28.

Conformance monitor 32 may also be configured to monitor traffic conformance with operational and alerting rules 48, runway or taxiway dimensions 42 received from runway/taxiway generator 18, traffic intent and clearances 41 received by the traffic surveillance processor 14 (e.g., is the traffic on the correct route, has the traffic violated any clearances like crossing a hold-line prior to receiving appropriate clearance, etc.) received from the traffic surveillance processor 16, based on traffic current and/or predicted states received from the predictions processor 28.

Alert/advisory priority manager 34 is configured to process and output runway incursion alerts and/or advisories to a display processor 26, which may subsequently be displayed on SAD 23. Alert/advisory priority manager 34 determines and processes alerts and advisories based on the operational and alerting rules 48, existing ground alerts 50, detected conflicts from conflict detector 30, and conformance data from conformance monitor 32. Alert/advisory priority manager 34 may provide an alert or advisory if a runway incursion is detected. Alert/advisory priority manager 34 may provide an indication when no incursion is detected.

Figure 3:
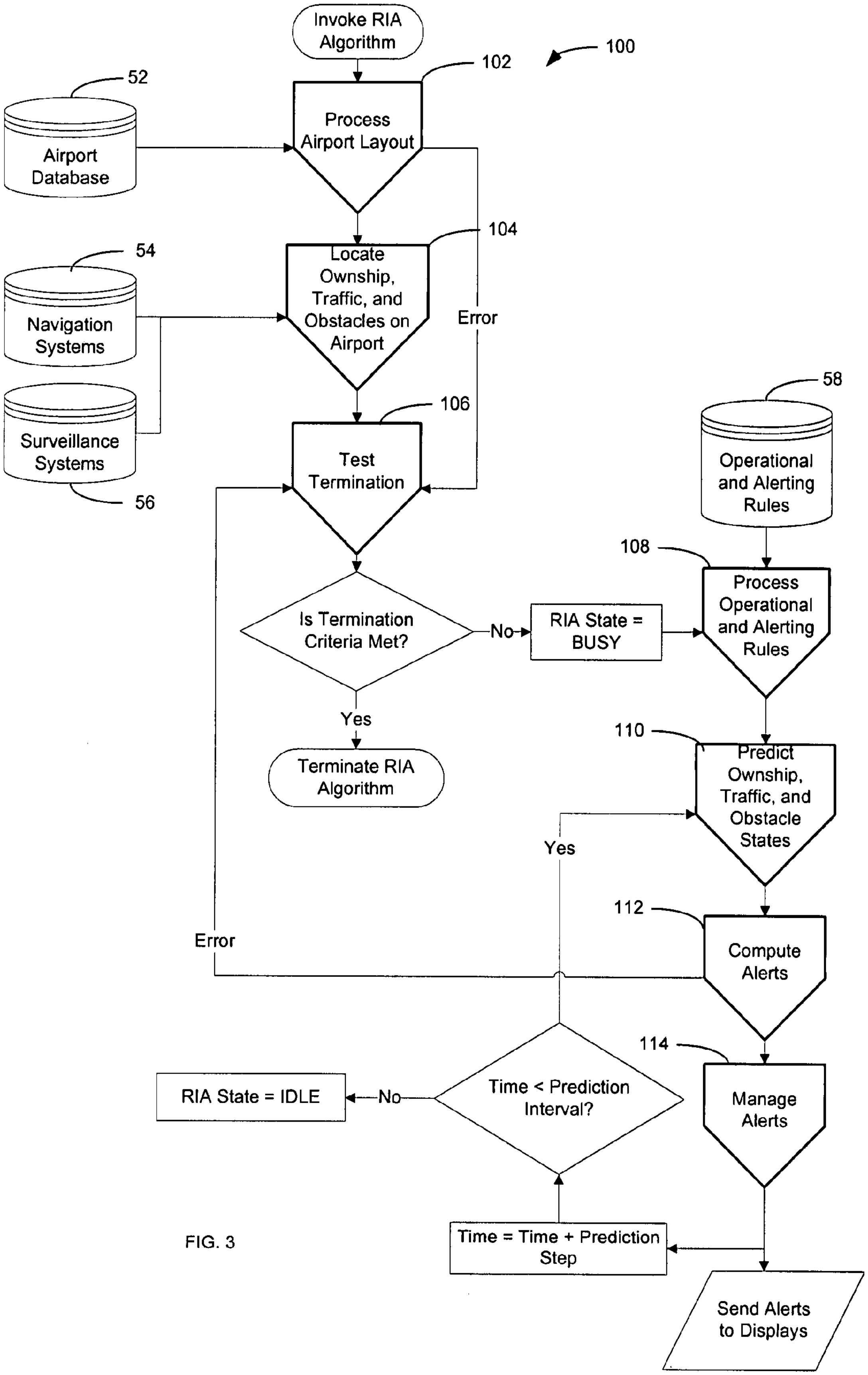
FIG. 3 is a process flow diagram that illustrates a runway incursion alerting algorithm of the runway incursion alerting system of FIG. 1 according to an exemplary embodiment.

Referring to FIGS. 3-14, the Runway Incursion Alerting (RIA) algorithm that is hosted on the Runway incursion Processor 22 is outlined in detail with a number of process flow diagrams. Referring specifically to FIG. 3, an overview of the RIA algorithm 100 is presented showing the algorithm components as well as the input and output interfaces. The inputs are the airport database 52, the ownship navigation system 54 (as processed by the Ownship Navigation Processor 12 in FIG. 1), the traffic and obstacle surveillance systems (as processed by the Traffic Surveillance Processor 14 in FIG. 1 and the Obstacle Detector 16 in FIG. 1), and the set of operational and alerting rules 58. The output is the set of alerts and advisories to be sent to the display processor 46.

At step 102, the airport layout is processed using data retrieved from an airport database 52. The system may perform a check to verify that the airport is in the airport database. The runway/taxiway layout and boundaries may be processed for one or more airports. For example, given data related to airport monitoring accuracy, intersections and hold-lines for each runway and taxiway may be computed.

At step 104, aircraft are located on the airport using data received from navigation system 54, surveillance systems 56, and the airport layout processed in step 102.

At step 106, algorithm 100 tests for termination conditions, for example an error that occurs while processing the airport layout in step 102. If termination criteria are met, algorithm 100 is terminated. Otherwise, the algorithm state is set as "BUSY."

At step 108, algorithm 100 processes operational and alerting rules received from an operational and alerting rules database 58 and determines whether the ownship and targets are in conformance with those rules. The operational and alerting rules may be particular to a specific airport or to a set of airports, and/or to the currently active airport configuration.

At step 110, future states of the ownship, traffic, and obstacles are predicted based on the current states, intent and clearance information, conformance, and operational and alerting rules.

At step 112, possible runway incursion alerts are computed based on the current and predicted ownship and target states of step 110, runway/taxiway geometry, operational and alerting rules 58, and/or ground alerts 50. If an error is encountered, RIA algorithm 100 may be terminated. The ownship conformance to the operational and alerting rules may be monitored (e.g., has the ownship violated any taxiway/runway boundaries, hold-lines, clearance instructions, attempting to land or take off from a runway that is not appropriate for ownship take off or landing, or approaching an area (e.g., closed taxiway) that is not appropriate for use) based on information contained in the airport charts/database (e.g., runway/taxiway boundaries), ownship current and predicted future states, clearances, etc. If an ownship conformance rule is violated, an ownship conformance alert may be generated. Targets conformance to the operational and alerting rules may be monitored based on information contained in the airport charts/database, the target's current and predicted states, clearances, etc. If traffic violates an operational conformance rule, a traffic conformance alert may be generated. Applicable alerts are generated and output.

At step 114, any computed alerts from step 112 are managed and prioritized based on the alert type and/or alert level. For example, the conformance alert level may be set to one level if the conformance alert type is related to an unknown location, a taxiway takeoff or landing, a taxiway constraint, a runway constraint, etc. The conformance alert level may be set to another level if the alert type is related to an occupied runway. The conformance alert level may be set to a third level if the alert type is related to a crossed hold-line. If a conflict alert level is greater than the conformance alert level (e.g., based on ownship conflict alert level, target alert level, target conformance alert type), the degree to which the conflict level is greater than the conformance level may determine the overall alert level. The alert types and levels are then sent to the display processor 26 for output to one or more display (e.g., a SAD 23, and/or audio system 24). If the calculated time before an incursion plus the time it takes to perform a prediction is less than the prediction interval, the algorithm goes back to step 110 to perform an updated aircraft prediction. Otherwise, the algorithm state is set as "IDLE" and the algorithm is complete until next invoked.

Figure 4:
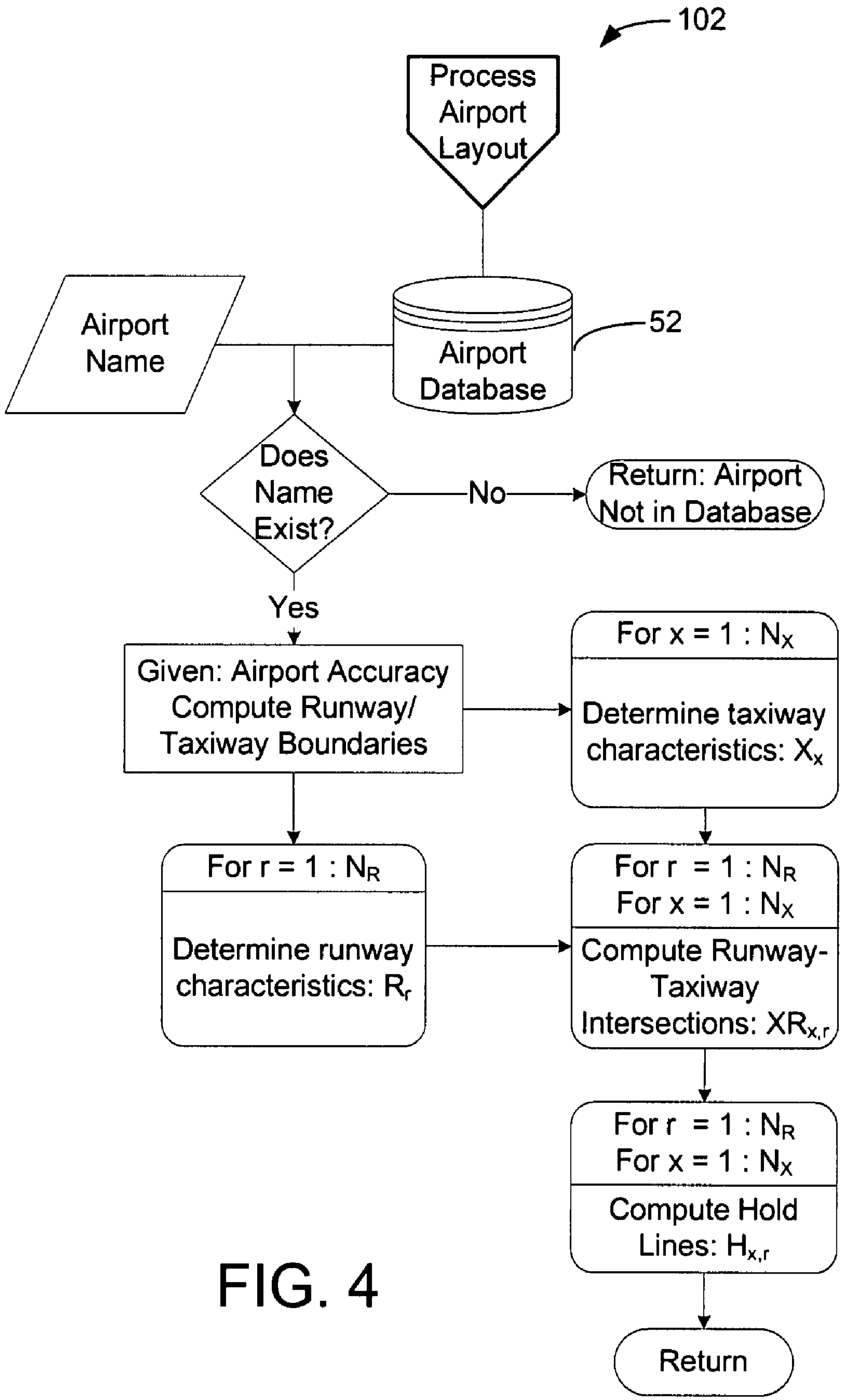
FIG. 4 is a process flow diagram that illustrates an airport layout process of the runway incursion alerting algorithm of FIG. 3 according to an exemplary embodiment.

Referring to FIG. 4, a process flow of the airport layout step 102 of algorithm 100 is shown. This function receives the available runway and taxiway dimensions and location data in addition to the airport name and the accuracy of the airport database. If the airport complies with the ICAO standards, then the algorithm can also use the airport ICAO Aerodrome Code Number for certain runway and taxiway parameters.

The airport layout process uses the available data to compute and store, for each runway and/or taxiway, (a) the centerline, (b) the hold lines, (c) the edges, (d) the intersections, and (e) the heading. The current computation of intersections may be modified to account for paths (e.g., truck routes) that cross a runway or a taxiway via an underground tunnel, so that a two-dimensional position of a vehicle on such a path is not erroneously considered a candidate for conflict detection.

Figure 5:
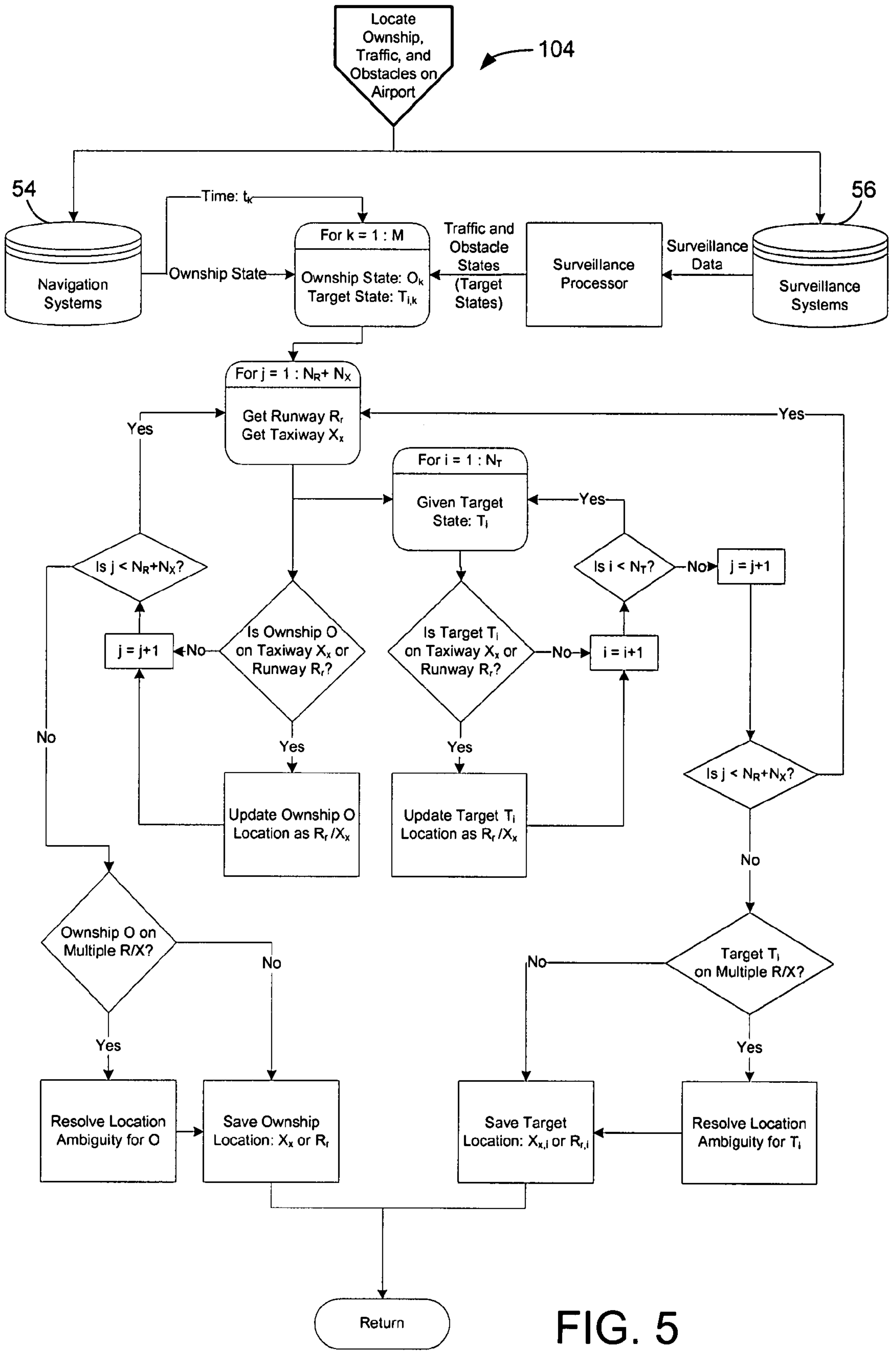
FIG. 5 is a process flow diagram that illustrates an aircraft location process of the runway incursion alerting algorithm of FIG. 3 according to an exemplary embodiment.

Referring to FIG. 5, a process flow of locate ownship, traffic, and obstacles on the airport step 104 of algorithm 100 is shown. This function receives the aircraft position and heading to associate the most likely runway, taxiway, etc. on which the ownship, traffic, and obstacles are located. Note that the location is used only for the predictions computation in the alerting algorithm; the aircraft (and any other appropriately equipped vehicle on the airport) is typically shown at its reported or sensed position for situational awareness. The ownship, traffic and obstacle locations are determined based on the ownship current and predicted states the traffic current and predicted states, and the obstacle current and predicted states for each time period k. The ownship (O) and target (i.e., traffic and obstacle) states for the $i^{th}$ target ($T_i$) at time period k are labeled $O_k$ and $T_{i,k}$ in FIG. 5. There are $N_T$ number of targets. The ownship and targets are checked to see if they are on the $r^{th}$ runway ($R_r$) or the $X^{th}$ taxiway ($X_x$), where $N_R$ is the number of runways and $N_x$ is the number of taxiways, or if they are at an intersection. Then, the ownship runway and taxiway location is saved as $R_r$ and $X_x$ respectively, and the $i^{th}$ target runway and taxiway locations are stored as $R_{r,i}$ and $X_{x,i}$. This information is subsequently used by the runway incursion alerting system's 10 incursion processor 22 to compute alerts 112.

Figure 6:
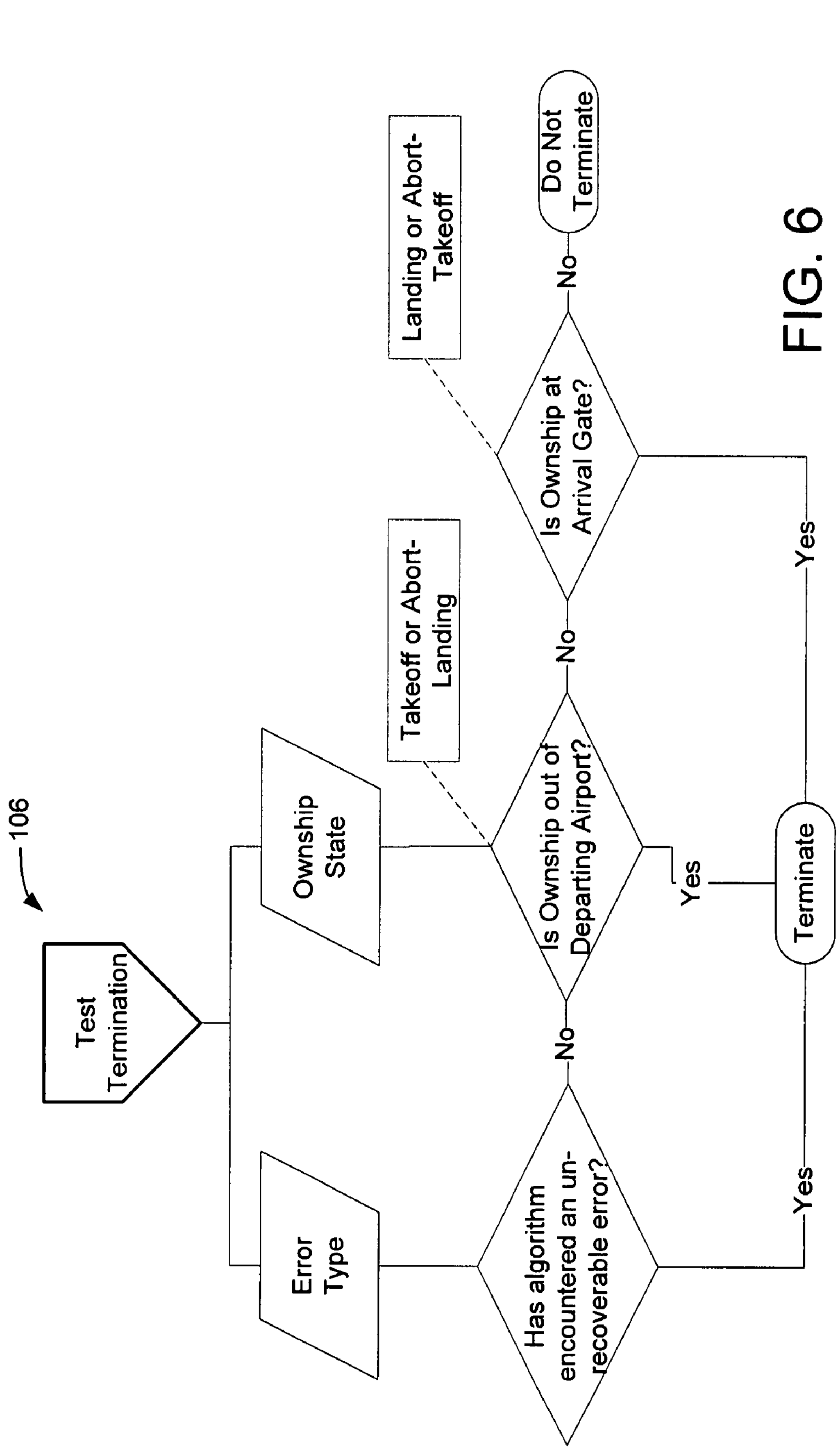
FIG. 6 is a process flow diagram that illustrates a termination testing process of the runway incursion alerting algorithm of FIG. 3 according to an exemplary embodiment.

Referring to FIG. 6, a process flow of the test termination step 106 of algorithm 100 is shown. This function receives any errors as well as the ownship current and predicted states to determine if algorithm 100 should be terminated. In the unlikely event the algorithm encounters an unrecoverable error, the algorithm may be terminated. If no unrecoverable error is encountered, but if (based on an ownship state) the ownship is determined to be departing from the airport (e.g., the ownship has taken off, aborted a landing, etc.) the algorithm may terminate. If the ownship is not departing the airport but is at an arrival gate the algorithm may terminate. Otherwise, algorithm 100 may proceed without terminating.

Figure 7:
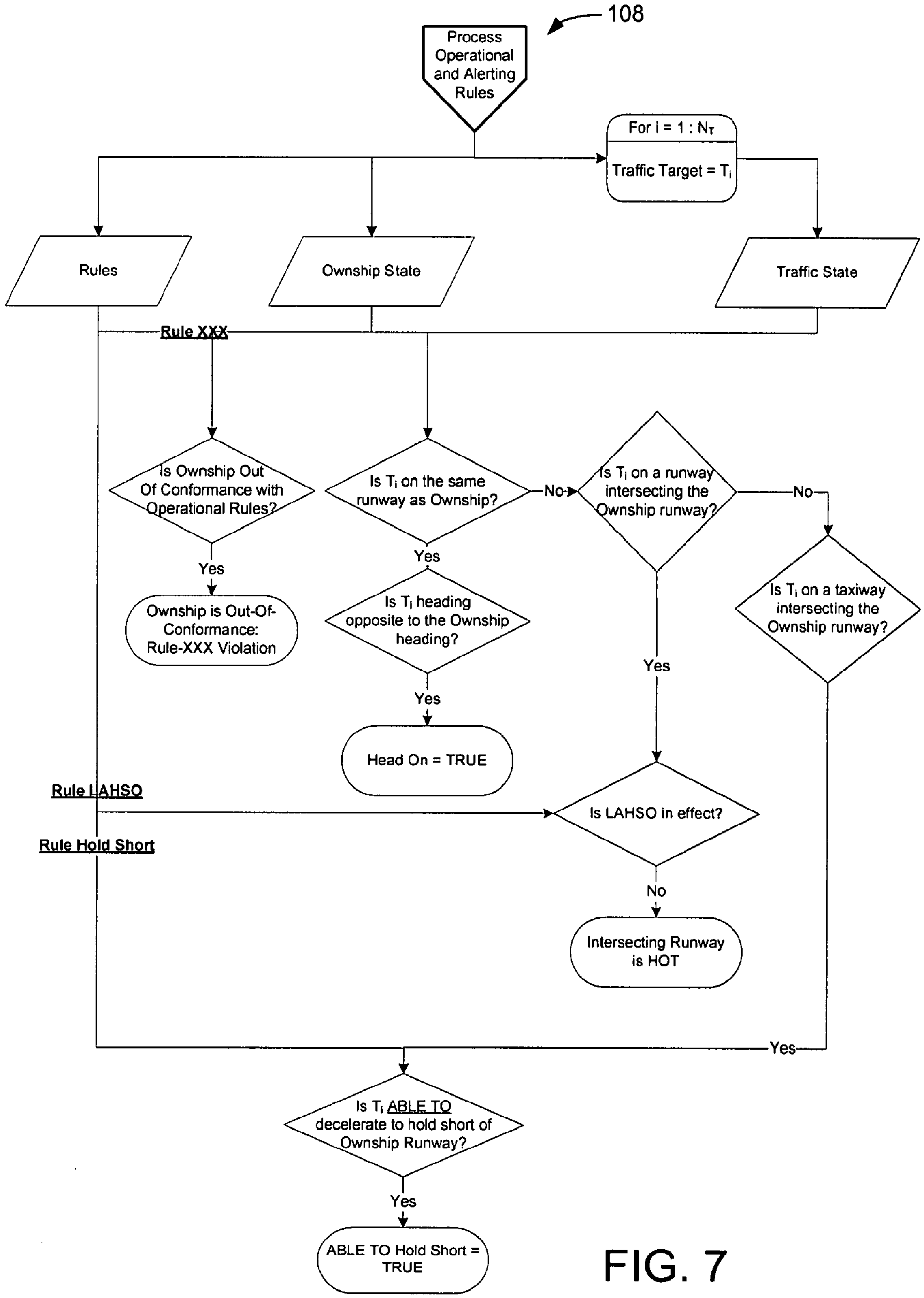
FIG. 7 is a process flow diagram that illustrates an operational and alerting rules processing for the runway incursion alerting algorithm of FIG. 3 according to an exemplary embodiment.

Referring to FIG. 7, a process flow of operational and alerting rules processing step 108 of algorithm 100 is shown. This process receives a set of operational and alerting rules, ownship states, and traffic states to determine if the ownship and/or traffic are following the rules of the airport. If the ownship is not in conformance with the rules, a message related to the specific rule violation may be returned. If traffic is on the same runway as ownship and heading opposite the ownship heading, a "Head On" variable may be set to "TRUE." If traffic is not on the same runway as the ownship but is on a runway intersecting that of the ownship and Land And Hold Short Operations (LAHSO) are in effect, a message is returned indicating that the intersecting runway is "HOT." If traffic is not on the same runway as the ownship and is not on a runway intersecting that of the ownship, the system checks whether the traffic is on a taxiway intersecting the ownship runway. If so, the system determines whether the traffic is capable of decelerating to hold short of the ownship runway and returns a message indicating that traffic is capable of holding short to the ownship.

Figure 8:
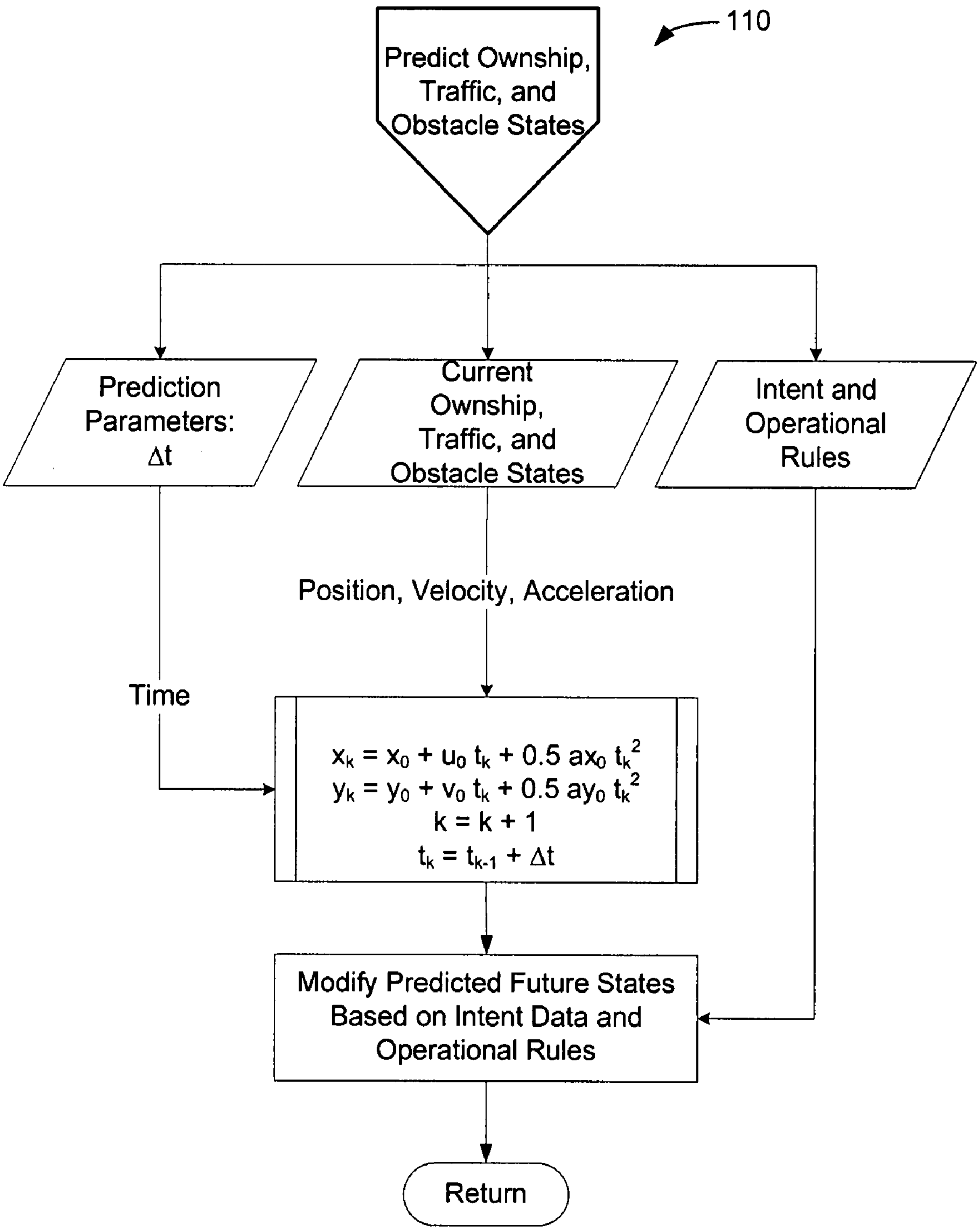
FIG. 8 is a process flow diagram that illustrates the ownship, traffic, and obstacle states prediction process of the runway incursion alerting algorithm of FIG. 3 according to an exemplary embodiment.

Referring to FIG. 8, a process flow of ownship traffic, and obstacle state prediction step 110 of algorithm 100 is shown. This process uses prediction parameters (e.g., time increment ($\Delta t$)); current ownship, traffic, and obstacle states (e.g., position ($x_0$ and $y_0$); velocity ($u_0$ and $v_0$); acceleration ($ax_0$ and $ay_0$); etc.), intent data, and operational rules to predict the future positions ($x_k$ and $y_k$) of ownship traffic and obstacles at the $k_{th}$ time increment ($t_k$).

Figure 9:
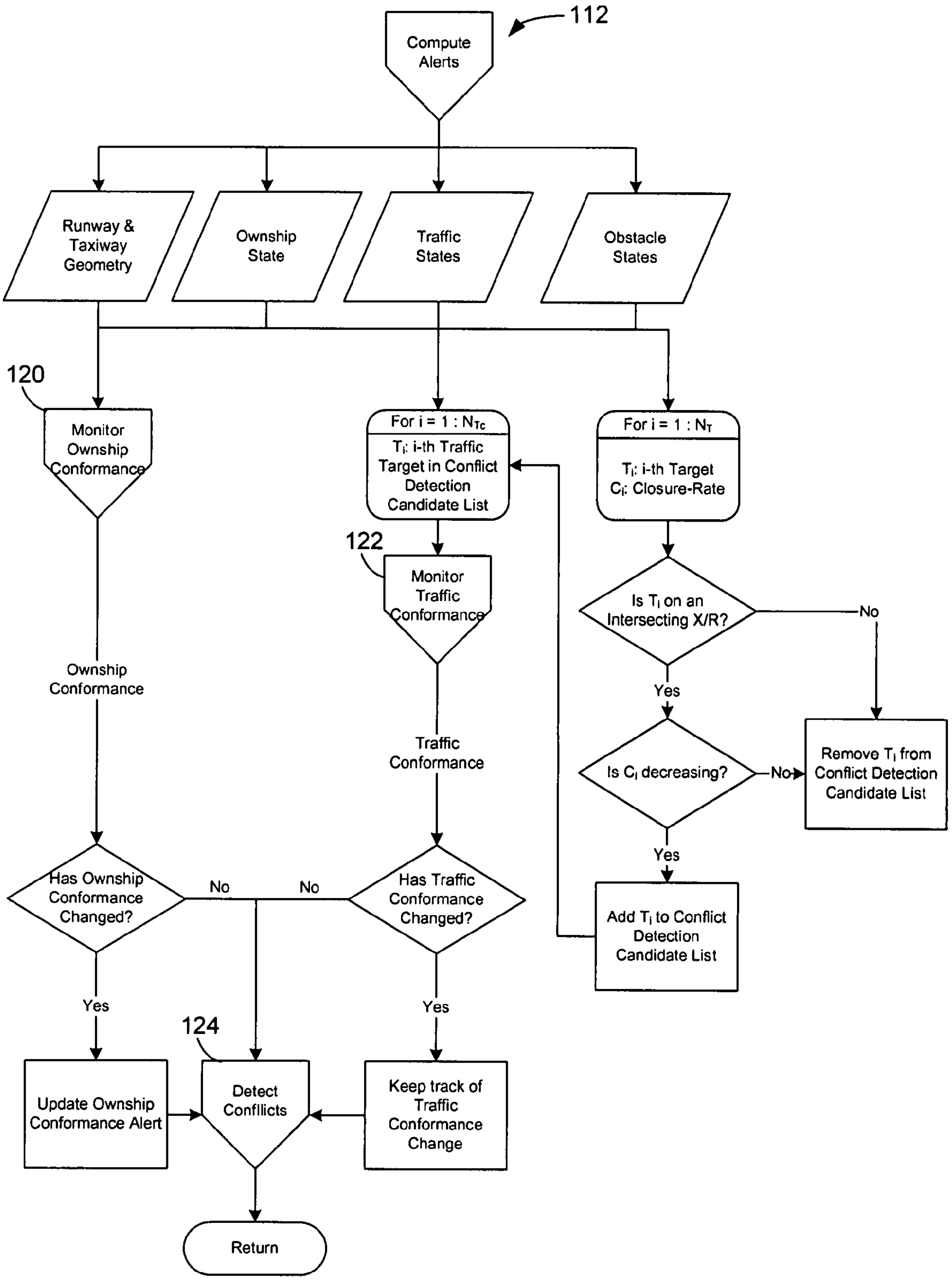
FIG. 9 is a process flow diagram that illustrates an alert computation process of the runway incursion alerting algorithm of FIG. 3 according to an exemplary embodiment.

Referring to FIG. 9, a process flow of alert computation step 112 of algorithm 100 is shown. This function receives the airport geometry, the ownship states and target states (i.e., the traffic and obstacle states). The ownship conformance to the operational and alerting rules may be monitored (e.g., has the ownship violated any taxiway/runway boundaries, hold-lines, or clearance instructions) based on runway/taxiway boundaries, ownship location, ownship velocity, etc. If an ownship conformance rule is violated, an ownship conformance alert may be generated.

The traffic conformance to the operational and alerting rules may be monitored (e.g., has traffic violated any taxiway/runway boundaries, hold-lines, or clearance instructions) based on traffic and ownship location data, bearing data, velocity data, etc. for each object in a candidate list. Traffic and obstacle objects are populated into the conflict detection candidate list if their heading intersects an ownship taxiway or runway and the closure-rate is decreasing. Traffic and obstacles are removed from the candidate list of the conflicting targets when they are not on an intersecting runway or taxiway or if the closure-rate is not decreasing. If traffic violates an operational conformance rule, a traffic conformance alert may be generated. Based on any ownship, traffic, or obstacle alerts (or lack thereof), conflicts are detected (e.g., the ownship and traffic paths may intersect) and any applicable alerts are generated and output.

Figure 10:
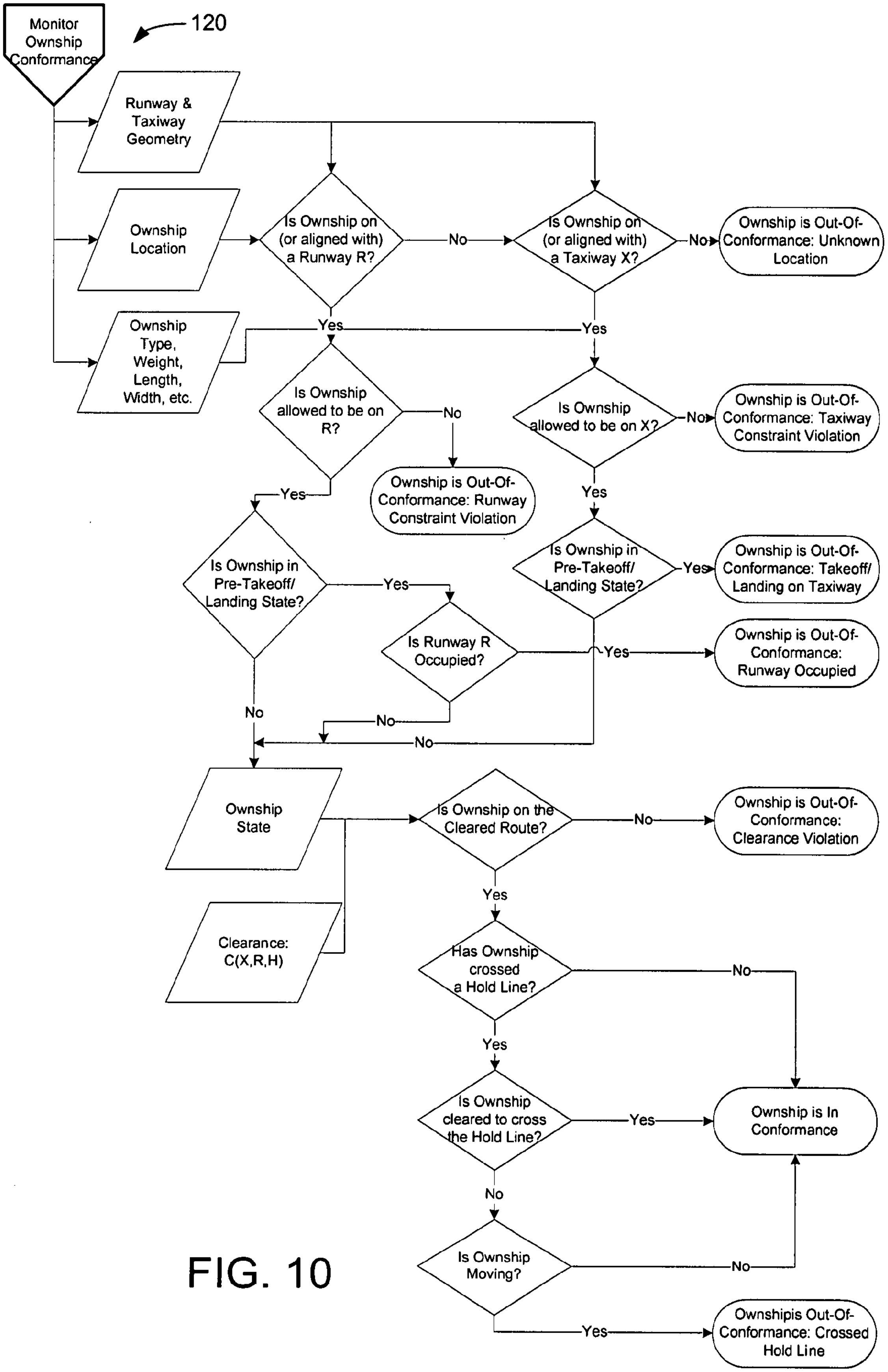
FIG. 10 is a process flow diagram that illustrates an ownship conformance monitoring process of the alert computation process of FIG. 9 according to an exemplary embodiment.

Referring to FIG. 10, an ownship conformance monitoring process 120 of alert computation step 112 is shown. This function receives runway and taxiway geometry, ownship location, and other ownship parameters (e.g., type, weight, length, width, etc.) to verify whether the ownship is in conformance with runway/taxiway geometries and runway/taxiway clearances and rights. If the ownship is not on a known runway or taxiway an out-of-conformance message identifying an unknown location of the ownship is returned.

If the ownship is located on a specific runway or is projected to soon be on a runway (e.g., on approach to land at a runway), but is not allowed to be on that runway, an out-of-conformance message identifying a runway constraint violation is returned. If the ownship is allowed to be on the runway, is in a pre-takeoff or landing phase of operation, and the runway is occupied, an out-of-conformance message identifying an occupied runway is returned.

If the ownship is located on a specific taxiway, but is not allowed to be on that taxiway, an out-of-conformance message identifying a taxiway constraint violation is returned. If the ownship is allowed to be on the taxiway and is in a pre-takeoff or landing phase of operation, an out-of-conformance message identifying an attempted takeoff or landing on a taxiway is returned.

If the ownship is on an unoccupied runway or is not in a pre-takeoff or landing phase of operation, but is not on a cleared route (based on the ownship state and clearance parameters), an out-of-conformance message identifying a clearance violation is returned. If the ownship is on a cleared route, has crossed a hold line, is not cleared to cross that hold line, and is moving, an out-of-conformance message identifying a crossed hold line is returned. If the ownship is on a cleared route and has not crossed a hold line, is cleared to cross a hold line, or is not moving, a message is returned indicating that the ownship is in conformance with the rules.

Figure 11:
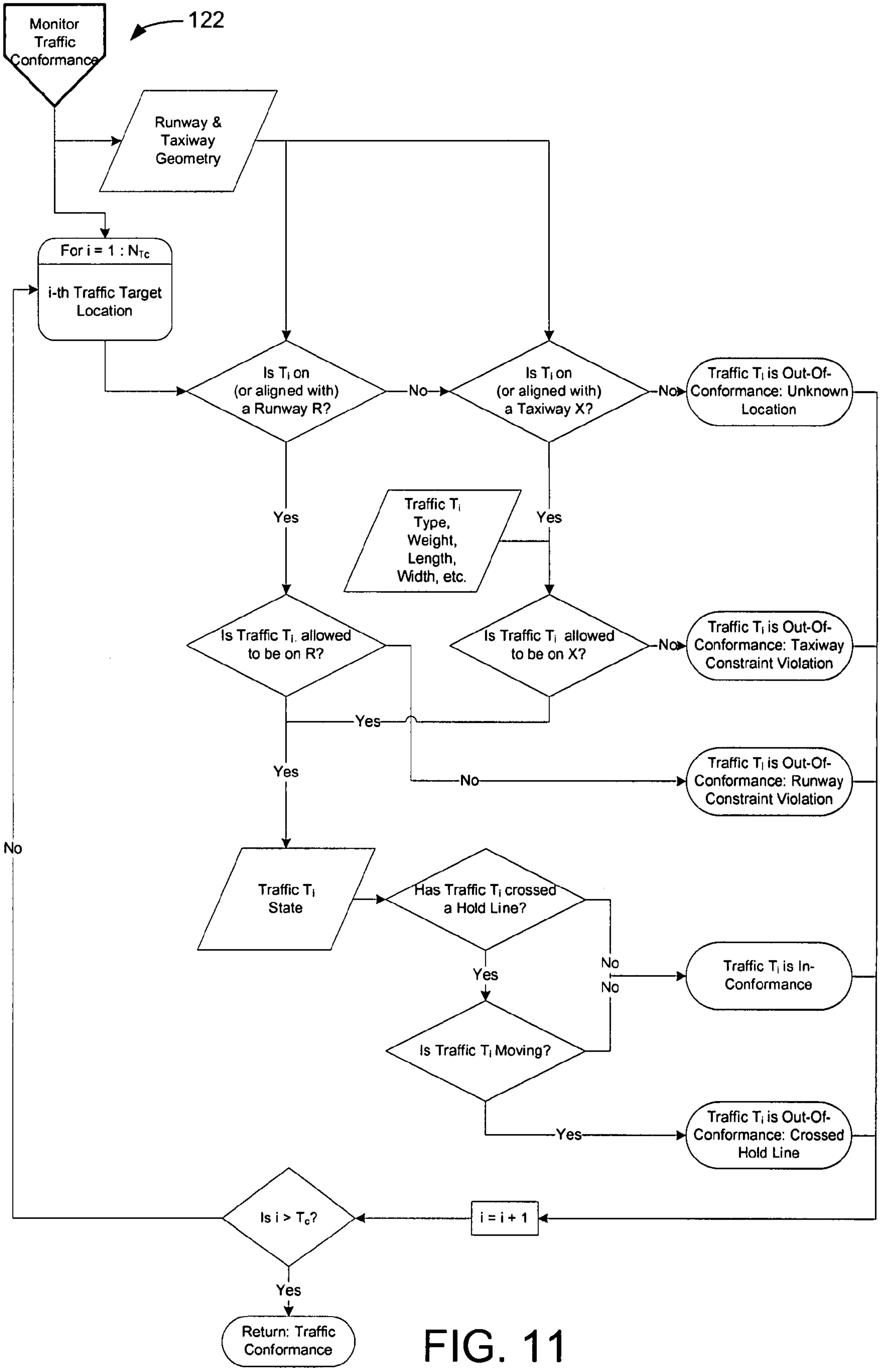
FIG. 11 is a process flow diagram that illustrates a traffic conformance monitoring process of the alert computation process of FIG. 9 according to an exemplary embodiment.

Referring to FIG. 11, a traffic conformance monitoring process 122 of alert computation step 112 is shown. This function receives runway and taxiway geometry, traffic states (e.g., location), and other traffic parameters (e.g., type, weight, length, width, etc.). This data is used to verify (via a loop) whether each traffic object is in conformance with runway/taxiway geometries and runway/taxiway clearances and rights. If a traffic object is not on or aligned with a runway or taxiway, an out-of-conformance message identifying an unknown location of the traffic object is returned.

If a traffic object is on or aligned with a runway, but is not allowed to be on that runway, an out-of-conformance message identifying a runway constraint violation is returned. If a traffic object is on or aligned with a taxiway, but (based on the traffic object type, weight length, width, etc.) is not allowed to be on that taxiway, an out-of-conformance message identifying a taxiway constraint violation is returned.

If the traffic object is allowed to be on a runway or taxiway, but, based on a traffic state, has crossed a hold line and is moving, an out-of-conformance message identifying a crossed hold line is returned. If the traffic object has not crossed a hold line or is not moving, a message is returned indicating that the traffic object is in conformance with the rules.

Figure 12:
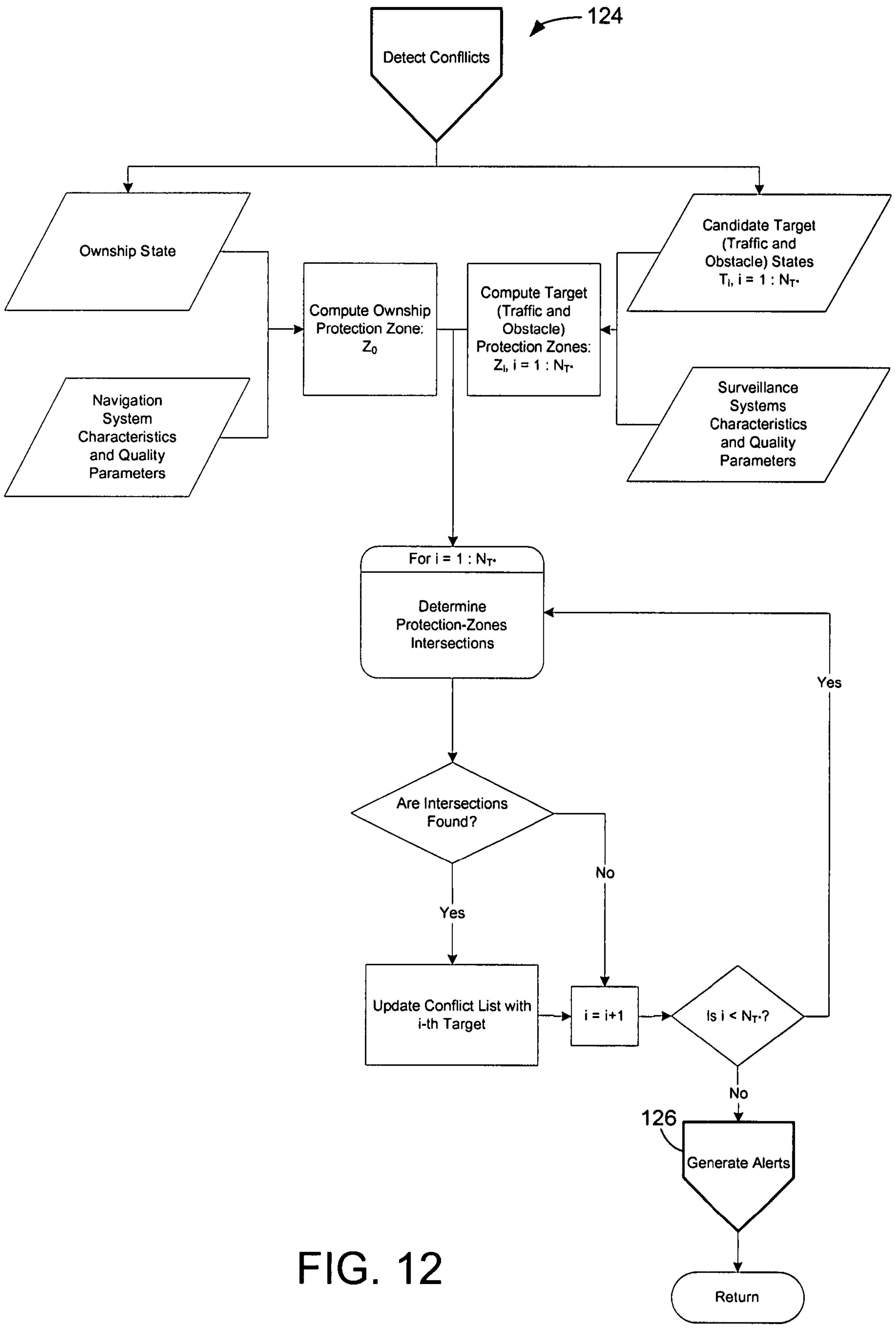
FIG. 12 is a process flow diagram that illustrates a conflict detection process of the alert computation process of FIG. 9 according to an exemplary embodiment.

Referring to FIG. 12, a conflict detection process 124 of alert computation step 112 is shown. This function receives ownship state, navigation system characteristics and quality parameters, candidate traffic and obstacle states, and surveillance characteristics and quality parameters. This data is used to determine protection zones around the ownship, traffic, and obstacles that should not be broken in order to avoid incursion. An ownship protection zone is computed based on the ownship state and navigation system characteristics and quality parameters. A protection zone for each traffic and obstacle candidate is computed based on the candidate traffic and obstacle states and surveillance system characteristics and quality parameters. For each traffic and obstacle candidate, protection zone intersections with the ownship are determined. If an intersection is found, the conflict list is updated with the traffic or obstacle object candidate. Once the conflict list is updated for each candidate, the conflict list is returned for alert generation.

Figure 13:
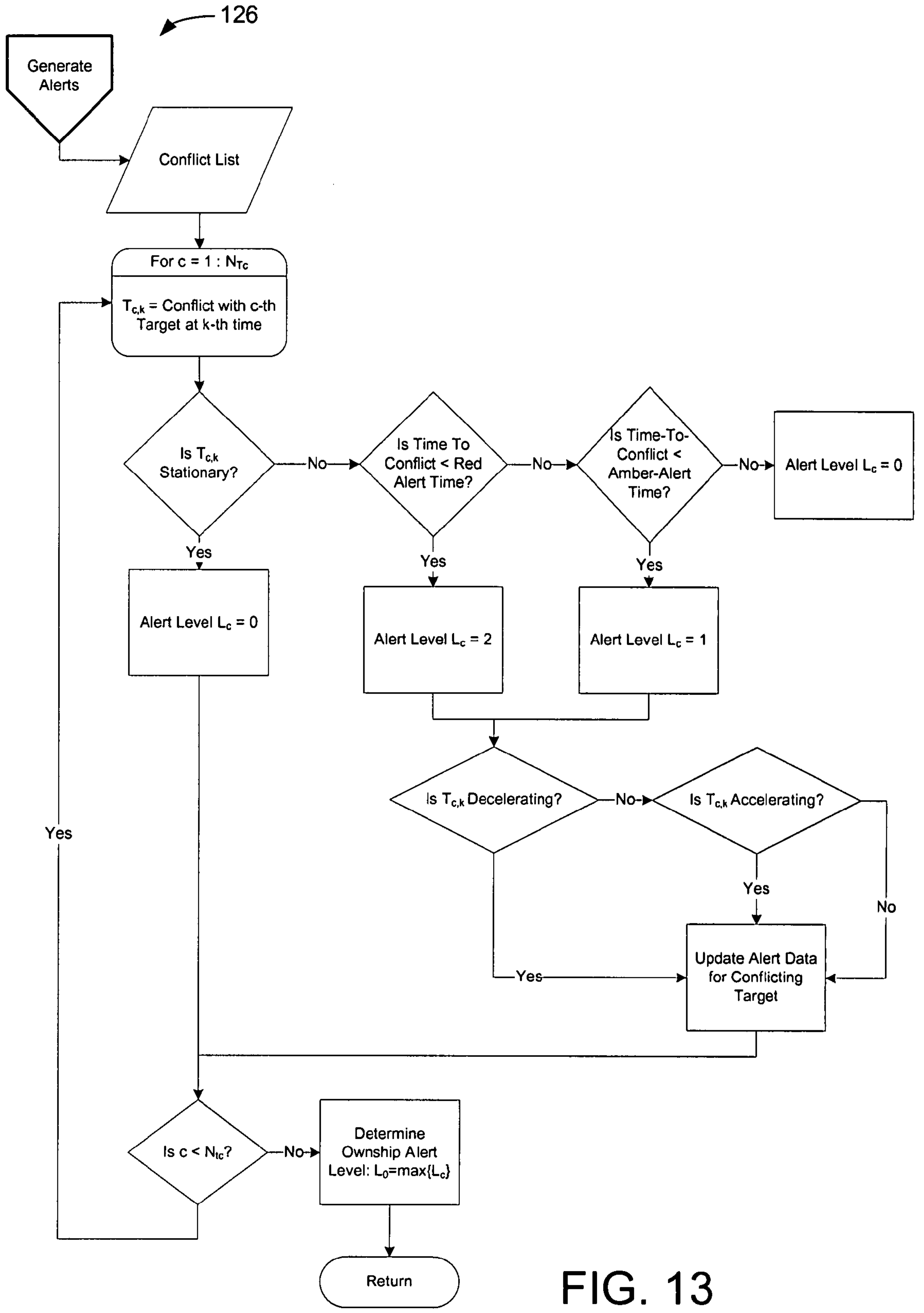
FIG. 13 is a process flow diagram that illustrates an alert generation process of the conflict detection process of FIG. 12 according to an exemplary embodiment.

Referring to FIG. 13, an alert generation process 126 of conflict detection process 124 is shown. This function receives the list of conflicts from conflict detection process 124 and assigns conflict alerts and advisories with corresponding conflict alert levels for each object in the conflict list.

If the traffic or obstacle object is stationary, the alert level for the object is set to a value of "0." If the object is moving, the time until the conflict is not less than time to a red alert, and the time until the conflict is not less than the time to an amber alert, the alert level is set to a value of "0."

If the traffic or obstacle object is moving and the time until the conflict is less than time to a red alert, the alert level is set to a value of "2." If the object is moving, the time until the conflict is not less than time to a red alert, and the time to a conflict is less than an amber alert, the alert level is set to a value of "1." Once the time until conflict is determined to be less than the time for a red or amber alert and the alert level has been set, the system determines whether the traffic or obstacle object is decelerating or accelerating. The acceleration data is used to update the alert level for conflicting object. As an example, when traffic is very rapidly decelerating while on a runway, it is likely that the traffic is performing rollout after landing. When traffic is very rapidly accelerating while on a runway, it is likely that the traffic is on its takeoff roll. For such cases, the alert level may be adjusted up or down based upon the operational and alerting rules (e.g., Land and Hold Short Operations are in effect and there is a very high level of deceleration that is likely to stop the incurring traffic before it passes the crossing runway, so reduce the Alert Level from 1 to 0).

Based on the aggregate of all traffic and obstacle alert levels, the ownship alert level is determined to be equal to the greatest of the traffic and obstacle alert levels. The ownship, traffic, and obstacle alert levels are then returned to conflict detection process 124.

Figure 14:
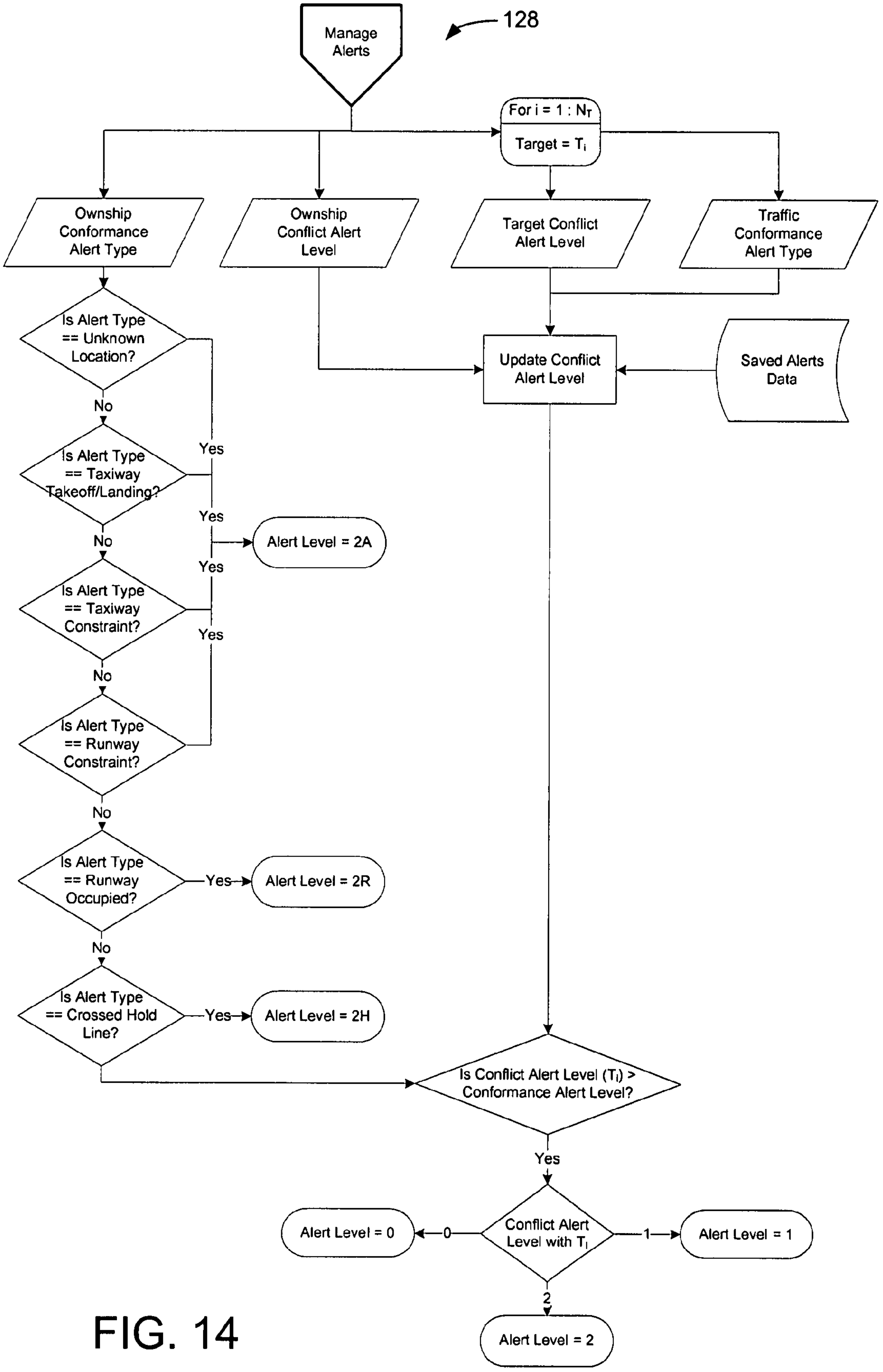
FIG. 14 is a process flow diagram that illustrates an alert management process of the runway incursion alerting algorithm of FIG. 3 according to an exemplary embodiment.

Referring to FIG. 14, an alert management process 128 of algorithm 100 is shown. This function receives ownship, traffic, and obstacle alert/advisory types and alert/advisory levels and compares them to saved alert data to prioritize and manage each alert/advisory for display in the ownship. The conformance alert level may be set to one level if the conformance alert type is related to an unknown location, a taxiway takeoff or landing, a taxiway constraint, a runway constraint, etc. The conformance alert level may be set to another level if the alert type is related to an occupied runway. The conformance alert level may be set to a third level if the alert type is related to a crossed hold-line. The conflict level is updated based on an ownship conflict alert level, traffic and obstacle alert levels, traffic conformance alert type, and saved alert data for each traffic and obstacle object. If the conflict alert level is greater than the conformance alert level, the degree to which the conflict level is greater than the conformance level may determine the overall alert level. The alert types and levels are then returned to algorithm 100 for transmission sent to an aircraft display (e.g., a SAD 23) and/or audio system 24.

Referring to FIGS. 15-20, the RIA algorithm was used to identify incursion alerts for a number of runway incursion alerting scenarios. Note that the plots in this section do not show the cockpit display, but are intended to illustrate the algorithm alert level outputs. The notation used is as follows: green=no advisory/alert, amber=caution advisory, red=conflict alert, cyan=traffic is likely to stop (shown to avoid false alerting), and white=traffic not relevant to algorithm (shown to determine candidate traffic).

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. In this application, the term real-time refers to performance of an activity in real time, pseudo real time, or actively in time for performance of an activity. Furthermore, other substitutions, modifications, changes, and omissions may be made in the design, operating conditions, and arrangement of the exemplary embodiments without departing from the scope of the invention as expressed in the appended claims.

What is claimed is:

1. An apparatus for detecting incursions for an aircraft or other airport surface vehicles, the apparatus comprising:

an incursion processor aboard the aircraft receiving ownship information from an ownship navigation processor, traffic information from a traffic surveillance processor, obstacle information from an obstacle detector, and airport layout information from a database and generating alert information in response to alerting rules, wherein the alerting rules are from a set of alerting rules associated with particular airports or sets of airports; and a display processor for displaying the alert information.

2. The apparatus of claim 1, wherein the alert information is provided to an alert advisory processor, the alert advisory processor provides a display formatted signal for the display processor, the display formatted signal including at least some of the alert information and aircraft chart information.

3. The apparatus of claim 1, wherein the traffic information is based upon at least one of TIS-B, ADS-B, ADS-R, and TCAS, or any combination thereof.

4. The apparatus of claim 1, wherein the obstacle information is radar information, optical information, millimeter wave information, acoustic information, LIDAR information, or FM continuous wave information.

5. The apparatus of claim 1, wherein the alerting rules are specific to a particular airport.

6. The apparatus of claim 1, wherein the alerting rules are specific to a specific region of the airport, or the current operational configuration of the airport.

7. The apparatus of claim 1, wherein incursion processor receives ownship taxi route information from a traffic surveillance processor.

8. The apparatus of claim 1, wherein incursion processor receives traffic taxi route information from a runway/taxiway generator.

9. A method of detecting an incursion on board an ownship vehicle, the method comprising:

electronically receiving an airport layout associated with an airport;

electronically receiving a state of the ownship vehicle;

electronically receiving a state of aircraft traffic in the vicinity of the airport;

electronically receiving a state of surface vehicles in the vicinity of the airport;

electronically receiving a state of obstacles in the vicinity of the airport;

electronically receiving operational and alerting rules for incursion detection; and computing incursion alerts using an electronic processor based upon the alerting and operational rules, and the state of the ownship vehicle, the state of aircraft traffic, and the state of obstacles, the alerting and operational rules being selected from a set of alerting and operational rules specific to particular airports.

10. The method of claim 9, further comprising:

predicting one or more future states of the ownship vehicle;

predicting one or more future state of traffic, and predicting one or more future state of obstacles.

11. The method of claim 9, further comprising:

providing the incursion alerts.

12. The method of claim 11 wherein the incursion alerts are provided aurally, visually, or tactilely.

13. The method of claim 9, further comprising terminating one or more of the incursion alerts based upon one or more of ownship state and the airport layout.

14. The method of claim 9, wherein the incursion alerts are determined using one or more real-time sensors and traffic surveillance information.

15. The method of claim 9 wherein a conflict detection algorithm is utilized to compute the incursion alerts.

16. The method of claim 9 wherein a state of the ownship vehicle includes at least one of position, velocity, acceleration, time, altitude, heading, vehicle size, and phase of operation.

17. The system of claim 16 wherein the state of the ownship vehicle includes the phase of operation and includes at least one of push back, taxi, pre-take off, takeoff, approach, landing, flare, and rollout.

18. The method of claim 17 wherein the incursion alerts are determined during any one or more phase of operation.

19. The method of claim 17 wherein the incursion alerts are assessed during any one or more phase of operation.

20. The method of claim 9 wherein the airport layout is used to determine if the state of the ownship vehicle is out of conformance.

21. The method of claim 9 wherein the airport layout includes one or more of runways, taxiways, hold lines, gates, ramps, parking areas, surface vehicle routes, surface vehicle roads, deicing areas, hangars, buildings, maintenance areas, and parking areas.

22. The method of claim 9 wherein the airport layout is-used to determine if the state of the aircraft traffic is out of conformance.

23. The method of claim 9 wherein the airport layout is used to determine if the state of obstacles is out of conformance.

24. A system for providing alert information in an aircraft environment for an aircraft, the system comprising:

a real-time sensor interface for receiving obstacle information from at least one real-time sensor;

a traffic surveillance interface for receiving traffic information from at least one ground-based infrastructure type system;

a processor for use on board the aircraft for determining the alert information in response to ownship information, an airport chart, the traffic information, the obstacle information and alerting rules, the alerting rules being specific to a particular airport or set of airports.

25. The system of claim 24 wherein the processor applies alerting rules specific to the airport.

26. The system of claim 25 wherein the alerting rules are provided by at least one of database, datalink, manually entered by the pilot/vehicle operator or controller, or any combination thereof.

27. The system of claim 24 wherein the processor utilizes elliptical protection zones.

28. The system of claim 27 wherein the ownship information includes at least one of position, velocity, acceleration, time, and phase of operation.

29. The system of claim 28 wherein the phase of operation includes at least one of push-back, taxi, pre-takeoff, takeoff, approach, landing, flare, and rollout.

30. The system of claim 24 wherein the alerts are displayed upon a map representing the airport layout on a situational awareness display.

* * * * *